(12) United States Patent
Wilson et al.

(10) Patent No.: US 11,120,548 B2
(45) Date of Patent: Sep. 14, 2021

(54) ASSESSMENT OF ARTERIAL CALCIFICATIONS

(71) Applicant: Case Western Reserve University, Cleveland, OH (US)

(72) Inventors: David L. Wilson, Cleveland Heights, OH (US); David Prabhu, Dublin, OH (US); Chaitanya Kolluru, Cleveland, OH (US); Yazan Gharaibeh, Cleveland, OH (US); Hiram G. Bezerra, Cleveland, OH (US); Hao Wu, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 25 days.

(21) Appl. No.: 16/786,058

(22) Filed: Feb. 10, 2020

(65) Prior Publication Data

US 2020/0327664 A1 Oct. 15, 2020

Related U.S. Application Data

(60) Provisional application No. 62/831,810, filed on Apr. 10, 2019.

(51) Int. Cl.
*G06K 9/00* (2006.01)
*G06T 7/00* (2017.01)
(Continued)

(52) U.S. Cl.
CPC ............ *G06T 7/0012* (2013.01); *G06K 9/628* (2013.01); *G06K 9/6232* (2013.01); *G06K 9/6262* (2013.01); *G06K 9/6269* (2013.01); *G06N 5/003* (2013.01); *G06N 20/10* (2019.01); *G06T 5/20* (2013.01); *G06T 2207/10064* (2013.01); *G06T 2207/10101* (2013.01);
(Continued)

(58) Field of Classification Search
CPC ..................... G06T 7/0012; G06T 5/20; G06T 2207/10064; G06T 2207/10101; G06T 2207/10132; G06T 2207/20081; G06T 2207/30101; G06N 20/10; G06N 5/003; G06K 9/6232; G06K 9/6262; G06K 9/6269; G06K 9/628
See application file for complete search history.

(56) References Cited

U.S. PATENT DOCUMENTS

2015/0213629 A1* 7/2015 Celi ...................... G06T 7/0012 382/128
2017/0309018 A1* 10/2017 Shalev .................. G06T 7/0012

* cited by examiner

*Primary Examiner* — Atiba O Fitzpatrick
(74) *Attorney, Agent, or Firm* — Eschweiler & Potashnik, LLC

(57) ABSTRACT

Embodiments discussed herein facilitate classification of vascular plaque. One example embodiment can: access vascular imaging data comprising one or more slices, wherein each slice comprises a plurality of A-lines of that slice; for each A-line of the plurality of A-lines of each slice of the one or more slices: extract one or more features for that A-line, wherein the one or more features for that A-line comprise at least one of: one or more features extracted from that A-line, one or more features extracted from the slice comprising that A-line, or one or more features extracted from the vascular imaging data; provide the one or more features for that A-line to at least one classifier; and generate a classification of that A-line via the at least one classifier, wherein the classification of that A-line is one of fibrocalcific, fibrolipidic, or other.

28 Claims, 25 Drawing Sheets

(51) Int. Cl.
*G06T 5/20* (2006.01)
*G06K 9/62* (2006.01)
*G06N 20/10* (2019.01)
*G06N 5/00* (2006.01)

(52) U.S. Cl.
CPC ............... *G06T 2207/10132* (2013.01); *G06T 2207/20081* (2013.01); *G06T 2207/30101* (2013.01)

```
┌─────────────────────────────────────────────────────┐
│  ACCESS TRAINING SET OF VASCULAR IMAGING DATA       │
│  AND ASSOCIATED GROUND TRUTH CLASSIFICATION(S)      │
└─────────────────────────────────────────────────────┘
```
210

```
┌─────────────────────────────────────────────────────┐
│  OPTIONALLY PRE-PROCESS IMAGING VOLUMES OF THE      │
│  TRAINING SET OF VASCULAR IMAGING DATA              │
└─────────────────────────────────────────────────────┘
```
220

```
┌─────────────────────────────────────────────────────┐
│  EXTRACT ONE OR MORE FEATURES FOR EACH A-LINE       │
│  OF ONE OR MORE A-LINES OF EACH IMAGING VOLUME      │
│  OF THE TRAINING SET                                │
└─────────────────────────────────────────────────────┘
```
230

```
┌─────────────────────────────────────────────────────┐
│  PROVIDE THE EXTRACTED FEATURES AND                 │
│  ASSOCIATED GROUND TRUTH CLASSIFICATION FOR         │
│  EACH A-LINE TO AT LEAST ONE CLASSIFIER             │
└─────────────────────────────────────────────────────┘
```
240

```
┌─────────────────────────────────────────────────────┐
│  TRAIN THE AT LEAST ONE CLASSIFIER BASED ON THE     │
│  EXTRACTED FEATURES AND ASSOCIATED GROUND           │
│  TRUTH CLASSIFICATION FOR EACH A-LINE               │
└─────────────────────────────────────────────────────┘
```
250

```
┌─────────────────────────────────────────────────────┐
│  OPTIONALLY VALIDATE THE AT LEAST ONE CLASSIFIER    │
│  ON A TEST SET OF VASCULAR IMAGING DATA             │
└─────────────────────────────────────────────────────┘
```
260

FIG. 2

|  | 3C-RF | | | 3C-SVM | | |
|---|---|---|---|---|---|---|
|  | predicted | | | predicted | | |
|  | Other | Fibro-Lipidic | Fibro-Calcific | Other | Fibro-Lipidic | Fibro-Calcific |
| Five-fold cross-validation Training Data | | | | | | |
| actual Other | 0.7620± 0.0301 | 0.1327± 0.0439 | 0.1053± 0.0505 | 0.8003± 0.0286 | 0.1194± 0.0198 | 0.0803± 0.0372 |
| actual Fibro-Lipidic | 0.1548± 0.0724 | 0.7158± 0.1057 | 0.1294± 0.0750 | 0.1250± 0.0624 | 0.7578± 0.0854 | 0.1172± 0.0638 |
| actual Fibro-Calcific | 0.1880± 0.0551 | 0.2010± 0.1102 | 0.6111± 0.1041 | 0.1267± 0.0470 | 0.1932± 0.0940 | 0.6802± 0.0899 |
| Held-Out Test Set | | | | | | |
| actual Other | 0.7355 | 0.1775 | 0.0869 | 0.7690 | 0.1620 | 0.0708 |
| actual Fibro-Lipidic | 0.1051 | 0.7962 | 0.0987 | 0.0564 | 0.8833 | 0.0603 |
| actual Fibro-Calcific | 0.1818 | 0.1920 | 0.6262 | 0.1433 | 0.1636 | 0.6931 |

After Classification Noise Cleaning

3C-SVM

| actual \ predicted | Other | Fibro-Lipidic | Fibro-Calcific |
|---|---|---|---|
| Other | 0.8144 | 0.1319 | 0.0537 |
| Fibro-Lipidic | 0.0405 | 0.9448 | 0.0147 |
| Fibro-Calcific | 0.1394 | 0.1124 | 0.7482 |

Combined DB-Classifiers

| actual \ predicted | Other | Fibro-Lipidic | Fibro-Calcific |
|---|---|---|---|
| Other | 0.7990 | 0.1592 | 0.0417 |
| Fibro-Lipid | 0.0440 | 0.9363 | 0.0197 |
| Fibro-Calcium | 0.1419 | 0.1229 | 0.7352 |

ASSESSMENT OF ARTERIAL CALCIFICATIONS

CROSS REFERENCE TO RELATED APPLICATIONS

This application claims the benefit of U.S. Provisional Patent Application No. 62/831,810 filed Apr. 10, 2019, entitled "A-LINE ASSESSMENT OF PLAQUE IN INTRAVASCULAR OPTICAL COHERENCE TOMOGRAPHY", the contents of which are herein incorporated by reference in their entirety.

FEDERAL FUNDING NOTICE

This invention was made with government support under the grant(s) R01HL114406 and R01HL143484 awarded by the National Institutes of Health. The government has certain rights in the invention.

BACKGROUND

Intravascular optical coherence tomography (IVOCT) plaque classification could potentially affect many of the ~700,000 percutaneous coronary interventions performed annually. IVOCT can identify coronary fibrous, lipid, calcium, and macrophage deposition. IVOCT has significant advantages over other imaging modalities commonly used by interventional cardiologists. Clinicians routinely use of angiography for treatment planning to describe the vessel lumen; however, angiography does not provide specific information regarding vascular composition except in the case of severely calcified lesions. Intravascular ultrasound (IVUS) can identify coronary calcium but cannot assess calcium thickness because the signal reflects from the calcium/soft tissue interface, which results in an acoustic shadow following the calcium front surface. IVOCT, however, provides the location, circumferential extent, and thickness of calcium. IVOCT has an axial resolution of 15-20 (lateral resolution: 20-40) μm compared with 150-200 (lateral resolution: 200-300) μm for IVUS. Thus, IVOCT is the only intravascular imaging modality with the resolution and contrast sufficient for identifying thin-cap fibroatheromas (TCFAs), which are significant prognosticators of plaque rupture and subsequent myocardial infarction.

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

FIG. 2 illustrates a flow diagram of an example method/set of operations that can be performed by one or more processors to train at least one classifier to classify vascular plaque(s) based on vascular imaging data, according to various aspects discussed herein.

FIG. 14 illustrates confusion matrices showing true positive rates for the 3C-SVM and Three Class Random Forest (3C-RF) classifiers on the fivefold cross-validation training data and held out test set, in connection with various embodiments discussed herein.

FIG. 15 illustrates confusion matrices for binary fibrolipidic classification for the Dual Binary (DB) classifiers approach, in connection with various embodiments discussed herein.

FIG. 16 illustrates confusion matrices for binary fibrocalcific classification for the DB approach, in connection with various embodiments discussed herein.

FIG. 19 illustrates confusion matrices showing the effect of classification noise cleaning on true positive rates, in connection with various embodiments discussed herein.

FIG. 20 illustrates confusion matrices showing a comparison after classification noise cleaning between the 3C and DB classification approaches, in connection with various embodiments discussed herein.

DETAILED DESCRIPTION

Figure 1:
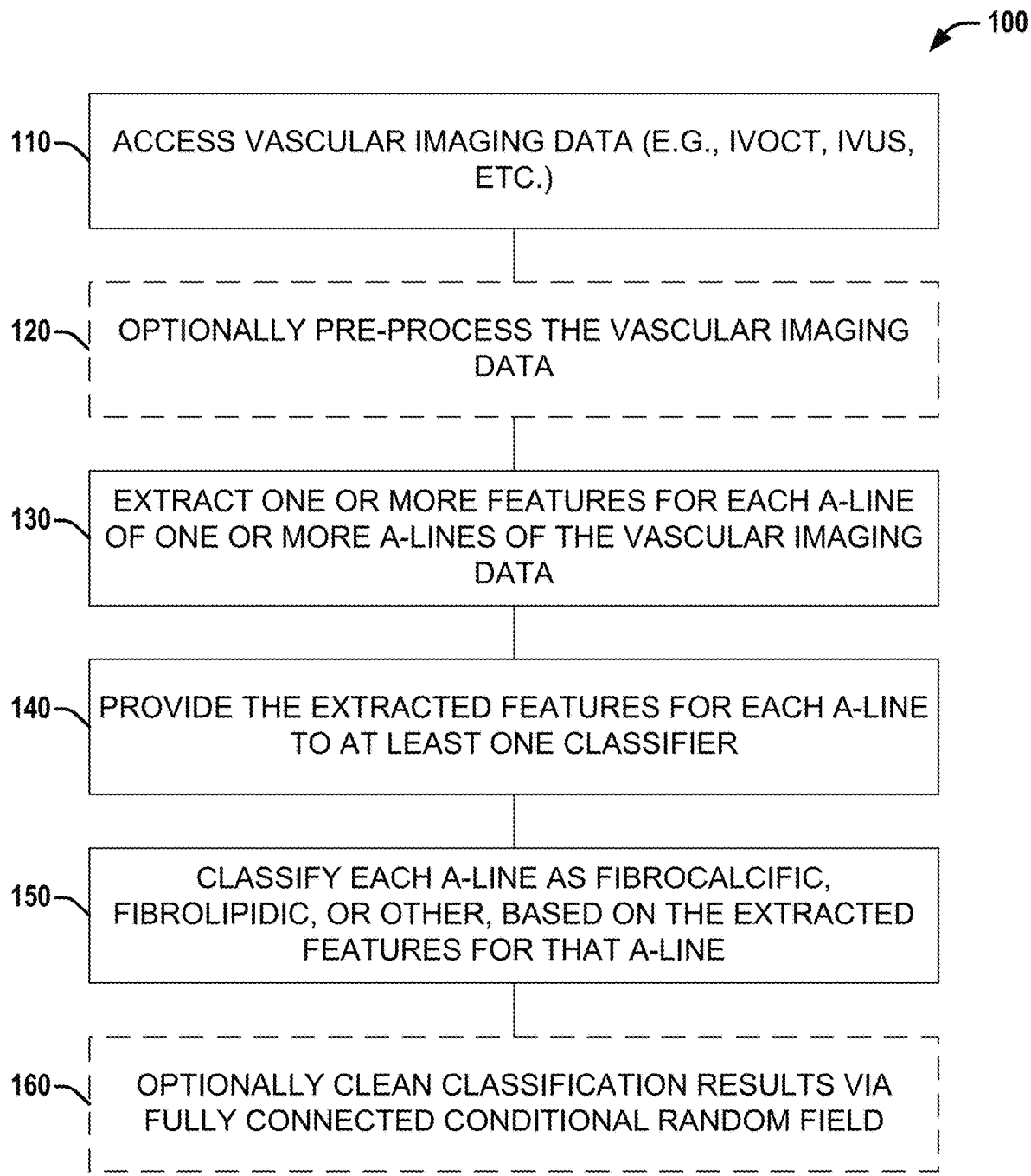
FIG. 1 illustrates a flow diagram of an example method/set of operations that can be performed by one or more processors to classify vascular plaque(s) in vascular imaging data, according to various aspects discussed herein.

Various embodiments discussed herein can comprise techniques that can facilitate automated classification of vascular plaque based on intravascular (IV) imaging (e.g., intravascular optical coherence tomography (IVOCT) images). These techniques can be highly automated or fully automated, enabling routine, sophisticated analysis of vascular plaque(s) (e.g., which can involve classification of plaque(s)) by embodiments employing those techniques. Embodiments can be employed for research and/or clinical evaluation (e.g., for treatment planning, etc.). Although various example embodiments and use cases discussed herein involve IVOCT, techniques discussed herein can also be applied in connection with other imaging techniques, such as IV ultrasound (IVUS), combined IVOCT/near-infrared fluorescence, combined IVUS/IVOCT image analysis, etc. Additionally, although various example embodiments and use cases discussed herein involve imaging of coronary arteries in human patients, techniques discussed herein can also be employed in connection with other arteries in humans and/or animals.

Embodiments can employ one or more of the following techniques discussed herein to facilitate classification of vascular plaques: (a) breaking up IVOCT (or IVUS, etc.) data into a logical part for analysis, IVOCT (or IVUS, etc.) A-lines; (b) calculating a large number of features including vascular lumen morphology, optical physics, A-line peaks, and/or 2D (two-dimensional)/3D (three dimensional) digital edge and/or texture features; (c) calculating one or more novel features discussed herein, such as change in lumen area, frame lumen eccentricity, change in frame lumen eccentricity across z, A-line Lumen Eccentricity (ALE), change in ALE across z, Anatomical View Lumen Curvature, R-θ view lumen Curvature, 2D entropy and/or range, 3D Laplacian, Laplacian of Guassian, High Pass, Sobel, and/or Prewitt; (d) use a classifier calculation engine such as a support vector machine (SVM) or random forest (RF) to classify A-lines; (e) train the A-line classifier; (f) classify A-lines as other, fibro-calcific, or fibro-lipidic; and/or (g) clean the classification results using conditional random fields (CRFs) on the en face images of the vessel wall.

Each of techniques (a) through (g), including variations and optional features, is described in greater detail herein. Additionally, it is to be appreciated that in various aspects, features, etc., indicated at one or more of (a) through (g) can be obtained as outputs from deep learning network(s).

Embodiments discussed herein have multiple advantages and aspects (many of which can facilitate improved classification) not available in existing techniques and methods. These include, but are not limited to, (a) the combination of classification plus segmentation to provide fully automated IVOCT (etc.) plaque characterization; (b) the use of Vascular Lumen Morphology and 3D digital edge/texture features; (c) the combination of local (e.g., close to the A-line of interest) and regional (e.g., up to ±n (e.g., 3, or 2, or 4 or more) frames away) for individual A-line plaque classification; (d) a unique ex vivo training dataset using 3D cryo-imaging/histology; and/or (e) combination of in vivo and ex vivo data for A-line plaque classification training.

Example embodiments and use cases are described in greater detail below. However, it is to be appreciated that these examples are intended to illustrate aspects and variations of embodiments, and that some embodiments may differ from the example embodiments and use cases described herein. For example, although, example implementations involving IVOCT in connection with human coronary arteries is discussed, other embodiments can involve other imaging techniques or combinations thereof (e.g., IVUS, IVOCT/IVUS, IVOCT/near-IR fluorescence, etc.) and/or different arteries (e.g., non-coronary and/or non-human animal, etc.). Additionally, while specific hand-crafted features are discussed, in various embodiments, 2D and 3D filter banks discussed herein can be enhanced via deep learning, such that the novel hand-crafted features can be combined with deep learned features and then fed into an RF or SVM classifier for classification. Additionally or alternatively, various features can be integrated into a deep learning approach, such that various hand-crafted features discussed herein can be integrated into the fully connected layers of a deep learning network, prior to network classification.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic or circuit, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Referring to FIG. 1, illustrated is a flow diagram of an example method/set of operations 100 that can be performed by one or more processors to classify vascular plaque(s) in vascular imaging data, according to various aspects discussed herein. Processor(s) can include any combination of general-purpose processors and dedicated processors (e.g., graphics processors, application processors, etc.). The one or more processors can be coupled with and/or can include memory or storage and can be configured to execute instructions stored in the memory or storage to enable various apparatus, applications, or operating systems to perform the operations. The memory or storage devices may include main memory, disk storage, or any suitable combination thereof. The memory or storage devices can comprise—but is not limited to—any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 100 can comprise, at 110, obtaining vascular imaging data of one or more arteries of a patient. In various embodiments and in the example use case discussed below, the vascular imaging data of one or more arteries can comprise intravascular optical coherence tomography (IVOCT) imaging data of a coronary artery. In other embodiments, intravascular ultrasound (IVUS) imaging or IVOCT imaging combined with one or more additional imaging modalities can be employed (e.g., IVOCT/IVUS, IVOCT/Near Infrared (NIR) Fluorescence, etc.). Additionally, although examples discussed herein relate to imaging of coronary arteries, various embodiments can also be employed in connection with other arteries. The imaging data can be obtained via a system and/or apparatus implementing the set of operations 100, or can be obtained from a separate medical imaging system 100. Additionally, the imaging data can be accessed contemporaneously with or at any point prior to performing the set of operations 100.

The set of operations 100 can further comprise, at 120, optionally performing pre-processing on the vascular imaging data obtained at 110 to improve the vascular imaging data. The pre-processing can comprise one or more of the techniques discussed herein, such as speckle reduction, correction for non-ideal intensities resulting from the imaging modality, or segmentation of a ROI (Region of Interest) such as the lumen.

The set of operations 100 can further comprise, at 130, extracting, for each A-line of one or more A-lines of the vascular imaging data, one or more features for that A-line. The one or more features for each A-line can be extracted from one or more of that A-line, a scan or frame comprising that A-line, or a three-dimensional (3D) part or the whole of the vascular imaging data. Features extracted for each A-line can comprise one or more of the features discussed herein, such as one or more lumen morphological features, one or more imaging tissue properties and/or geometric features, one or more A-line peak features, one or more two-dimensional (2D) digital edge and/or texture features, or one or more 3D digital edge and/or texture features.

The set of operations 100 can further comprise, at 140, providing the extracted features for each A-line to at least one classifier. The at least one classifier can comprise, for example: a three-class (3C) classifier trained to classify A-lines as fibrocalcific (FC), fibrolipidic (FL), or other; a dual binary (DB) classifier comprising a first binary classifier trained to classify A-lines as FC or other and a second binary classifier trained to classify A-lines as FL or other. In some embodiments, a triple binary classifier can be employed, comprising the first binary classifier and second binary classifier of the DB classifier, as well as a third binary classifier trained to classify A-lines as FC or FL. Each classifier of the at least one classifier can be, for example, one of a support vector machine (SVM) or random forest (RF), and can be the same or different when the at least one classifier comprises more than one classifier.

The set of operations can further comprise, at 150, classifying each A-line via the at least one classifier as FC, FL, or other, based on the extracted features for that A-line. When the at least one classifier comprises more than one classifier, classification results from the more than one classifier can be merged, and if an A-line is classified as more than one of FC or FL, it can be assigned the category with a higher probability. Alternatively, an additional classification of FC/FL can be employed for such A-lines and/or included as an initial classification category of the at least one classifier.

The set of operations can further comprise, at 160, optionally cleaning the classification results via a fully connected conditional random field (CRF). The CRF employed can be, for example, that described below in connection with the example use case, or can also employ intensity information and an appearance kernel as discussed below.

Referring to FIG. 2, illustrated is a flow diagram of an example method/set of operations 200 that can be performed by one or more processors to train at least one classifier to classify vascular plaque(s) based on vascular imaging data, according to various aspects discussed herein.

The set of operations 200 can comprise, at 210, obtaining a training set of vascular imaging data. In various embodiments, the training set of vascular imaging data can be the training set described herein in connection with the example use case, or can be another training set comprising one or more of a set of in vivo imaging volumes or a set of ex vivo imaging volumes according to one or more of the imaging modalities discussed herein (e.g., IVOCT, IVUS, IVOCT/IVUS, IVOCT/NIR Fluorescence, etc.). For whichever training set is employed, A-lines of the training set can be associated with a ground truth classification (e.g., via expert annotation, etc.).

The set of operations 200 can further comprise, at 220, optionally pre-processing each imaging volume of the training set of vascular imaging data via one or more of the pre-processing techniques discussed herein (e.g., speckle reduction, imaging correction, ROI segmentation).

The set of operations 200 can further comprise, at 230, extracting one or more features for each A-line (e.g., of each imaging volume of the training set). Features extracted for A-lines can be any of the features discussed herein, and can comprise one or more lumen morphological features, one or more imaging tissue properties and/or geometric features, one or more A-line peak features, one or more two-dimensional (2D) digital edge and/or texture features, or one or more 3D digital edge and/or texture features. In various embodiments, a larger number of features can be employed initially, and feature selection (e.g., via minimum-redundancy-maximum-relevance (mRMR) or Wilcoxon, etc.) can be employed to select a subset of the larger number of features to be employed in classification. Additionally, features can be normalized, as discussed below.

The set of operations 200 can further comprise, at 240, providing the extracted features to at least one classifier. The at least one classifier can comprise one or more of a SVM or RF classifier, and can be one or more of a 3C classifier, DB classifiers, or other classifier(s) discussed herein.

The set of operations 200 can further comprise, at 250, training the at least one classifier based on the extracted features and the associated ground truth for each A-line of the training set.

The set of operations 200 can further comprise, at 260, optionally validating the at least one classifier based on a test set of vascular imaging data (e.g., via set of operations 100 performed on each imaging volume of the test set of vascular imaging data, etc.).

Additional aspects and embodiments are discussed below in connection with the following example use case.

Example Use Case: A-Line Coronary Plaque
Classification for Intravascular OCT Images Using
Hand-Crafted Features and Large Datasets The following discussion provides example embodiments and techniques in connection with an example use case involving coronary plaque classification based on IVOCT imaging using techniques discussed herein.

Intravascular optical coherence tomography (IVOCT) can enable plaque characterization with excellent resolution and contrast. With ~500 images generated per pullback, opportunities for automated IVOCT image analysis exist. Accordingly, this example use case developed and employed automated machine learning methods to identify fibrolipidic and fibrocalcific IVOCT A-lines using hand-crafted features, which were inspired by: vascular lumen morphology, optical physics, A-line peaks, and 2D/3D digital edge and texture. Classification methods of the example use case were developed using expansive clinical in vivo and novel ex vivo 3D cryo-image/histology validation datasets (totaling ~7000 images). The example use case implemented image preprocessing (speckle reduction, OCT imaging system correction, and pixel shifting) and postprocessing (conditional random field). For the example use case, two strategies were developed for multiclass classification: a three-class (3C) approach, which looked for fibrolipidic and fibrocalcific A-lines simultaneously; and dual binary (DB) classifiers, which looked for fibrolipidic and fibrocalcific A-lines separately and then merged results together. 3C performance was superior on the data, with true positive rates on a held out test set (>1700 images) of: 81.4, 94.5, and 74.8 for other, fibrolipidic and fibrocalcific, respectively. It was found that inclusion of novel morphological and 3D features improved classification accuracy. The example use case provides an example embodiment that facilitates streamlining A-line classification output with fibrolipidic and fibrocalcific boundary segmentation methods. These and other embodiments can be employed for highly or fully automated IVOCT plaque characterization that can facilitate one or more of live-time treatment planning or offline assessment of drug and/or biologic therapeutics.

1. Introduction

Automated intravascular optical coherence tomography (IVOCT) plaque classification (e.g., via embodiments discussed herein) can affect many of the ~700,000 percutaneous coronary interventions performed annually. IVOCT can identify coronary fibrous, lipid, calcium, and macrophage deposition. IVOCT has significant advantages over other imaging modalities commonly used by interventional cardiologists. Clinicians routinely use angiography for treatment planning to describe the vessel lumen; however, angiography does not provide specific information regarding vascular composition except in the case of severely calcified lesions. Intravascular ultrasound (IVUS) can identify coronary calcium but cannot assess calcium thickness because the signal reflects from the calcium/soft tissue interface, which results in an acoustic shadow following the calcium front surface. IVOCT, however, provides the location, circumferential extent, and thickness of calcium. IVOCT has an axial resolution of 15-20 (lateral resolution: 20-40) µm, compared with 150-200 (lateral resolution: 200-300) µm for IVUS. Thus, IVOCT is the only intravascular imaging modality with the resolution and contrast sufficient for identifying thin-cap fibroatheromas (TCFAs), which are significant prognosticators of plaque rupture and subsequent myocardial infarction. With ~500 image frames generated in a single IVOCT pullback, opportunities for automated IVOCT image analysis exist, such as via embodiments and techniques discussed herein.

Several groups have achieved promising results for automated IVOCT plaque classification. A first group created a framework to characterize atherosclerotic tissue in IVOCT images using the optical attenuation coefficient. Their method involved linear fitting over averaged log-transformed IVOCT image data to compute the optical attenuation coefficient. The main limitation of the method was its sensitivity to transition areas between different tissues, because the method was designed to be applied to homogeneous tissue regions. Their study also had limitations with validation in trying to register IVOCT images to their corresponding histology. A second group, inspired by the work of the first group, described how optical parameters can be derived from clinical IVOCT image data. They used a 3D approach to analyze A-lines from volumes of interest (VOIs) within an atherosclerotic plaque and investigated various "robust" techniques to calculate the optical attenuation parameter. Their work, however, involved manually determined VOIs, which precluded complete automation, but demonstrated the feasibility of using optical parameters to discriminate plaque types in clinical IVOCT images. A third group used a discretized mathematical model to estimate optical attenuation at each pixel in an IVOCT image. Their method assumes that the entire light signal is absorbed within the imaging range and that optical attenuation can be calculated by comparing the intensity of a given pixel to the summation of the intensities in the pixels behind it. They used mathematical and phantom models to validate their methodology. A fourth group then applied the third group's methodology to IVOCT data and developed a discretized model to determine the backscatter coefficient at each point. Using these values, they could discriminate between mixed, calcium, fibrous, lipid, macrophage, and necrotic tissue. A fifth group was successful with pixel-wise plaque classification using optical attenuation and texture features. However, their analysis did not consider the normal artery wall or surrounding perivascular tissue, and they only used a sparse training database comprising 64 in vivo images. The fifth group also had success with pixel-wise and region-wise classification of mature and immature neointimal tissue over stents. This method involved extraction of 2D texture and statistical features from user-defined regions of interest (ROIs) and used a random forest classifier to perform classification. A sixth group had success with pixel-wise plaque classification using texture and intensity-based features. However, validation of the method was absent of histology and instead relied on expert labels of in vivo patient images. They had limited success with lipids, possibly because they did not consider the optical attenuation that occurs in lipid tissue, which causes the signal in this tissue to be bright at the border but to attenuate quickly with tissue depth. A seventh group had success with A-line plaque classification. They looked for fibrotic and fibrolipidic regions but did not consider fibrocalcific regions. They only considered 1D features of individual A-lines and did not consider regional information from adjacent A-lines, which could provide additional information regarding plaque type given the volumetric continuity of plaques. An eighth group developed a classification and segmentation method using texture features described by the Fourier transform and discrete wavelet transform. However, they struggled with discrimination of normal (adventitia) tissue from plaque because their method for adventitia detection depended on empirically determined thresholds to describe the adventitia boundary. Also, that study used expert annotation only for validation and not histology, potentially leading to labeling error.

In addition to plaque classification, several studies have developed plaque quantification methods. In work associated with embodiments discussed herein, an active contour model based on gradient information from custom match filters and tissue intensity was used to develop a method to detect calcium plaque boundaries. Additionally, that same work and a ninth group both developed graph search methods based on dynamic programming to segment the fibrolipidic boundary of thin-capped fibroatheroma lesions. All these segmentation methods, however, required the user to manually identify either a particular frame or ROI, with start and stop angular boundaries, containing plaque.

Figure 3:
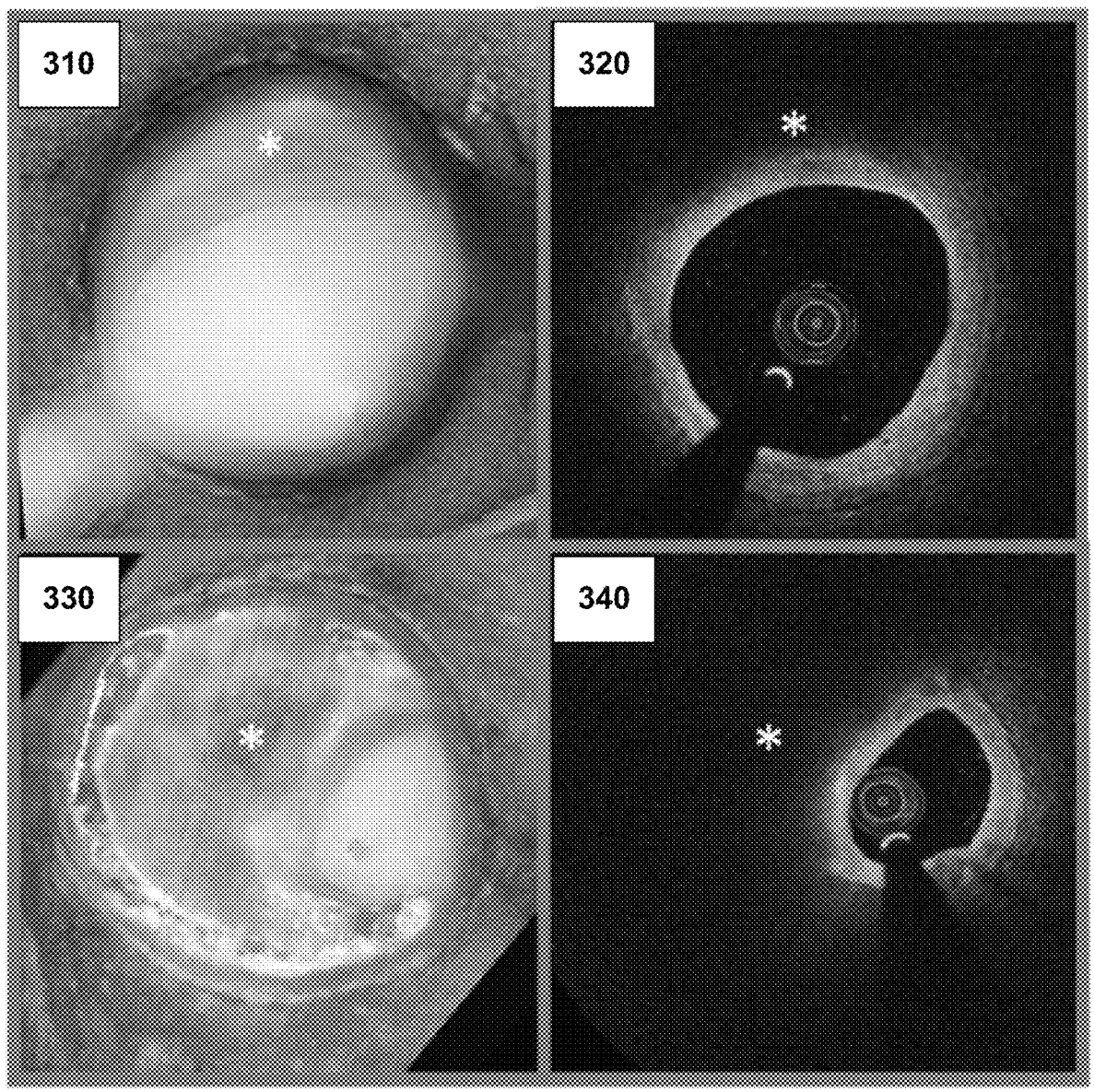
FIG. 3 illustrates a diagram showing example images of highly attenuating plaques that preclude voxel-wise plaque classification leading to volumetric assessments, in connection with various aspects discussed herein.

Although all the aforementioned studies were promising, several general limitations for their approaches exist. Many of the classification studies performed pixel-wise semantic plaque classification, but this approach has inherent drawbacks for IVOCT image analysis. For one, each IVOCT image is initially acquired as a sequence of 1D A-lines, which are then transformed into a 2D B-scan (also referred to herein as a slice or frame). Various vascular tissues cause characteristic backscatter and attenuation along the course of each A-line, which makes analysis along each A-line, as opposed to each pixel, a natural means of analyzing an IVOCT image. Furthermore, the IVOCT signal intensity can drop off precipitously after entering the vascular tissue, thus precluding pixel-wise assessments. Highly attenuating tissues, such as lipid plaque, can quickly absorb near-infrared light, so that the detected IVOCT signal is only visible within tens to a few hundreds of micrometers beyond the plaque border. Referring to FIG. 3, illustrated is a diagram showing example images 310-340 of highly attenuating plaques that preclude voxel-wise plaque classification leading to volumetric assessments, in connection with various aspects discussed herein. In images 310-340, examples of lipid/necrotic tissue (indicated via *) are shown in cryo-images on the left panels (images 310 and 330) and in corresponding IVOCT images on the right panels (images 320 and 340). In highly attenuating lipidous plaque, the IVOCT signal is only visible for a few hundred micrometers beyond the plaque border. This is one justification for using the A-line plaque classification approach of various embodiments discussed herein, rather than the more common pixel-wise classification methods. For calcium and lipid plaques, pixel-wise segmentation approaches can sometimes produce granular plaque boundaries, which do not coincide with what is observed histologically for such tissues. To better identify plaque boundaries, the plaque segmentation studies discussed above incorporated border smoothness and connectivity constraints. However, these plaque segmentation approaches required user input of plaque boundaries, which prevented them from being fully automatic.

Therefore, in the example use case, A-line plaque classification was performed to identify fibrolipidic and fibrocalcific A-lines. A-line classification was selected because it is a natural means of analyzing an IVOCT image. Semantic pixel-wise classification is severely compromised in regions containing fast-attenuating lipidic tissues, and it has difficulty identifying the histologically observed fibrolipidic and fibrocalcific plaque boundaries. Finally, the output of A-line classification can streamline into existing plaque boundary segmentation approaches to make them fully automatic. The example use case incorporated hand-crafted features developed in work discussed above that described IVOCT A-line peaks, optical attenuation, and 2D digital texture features (also studied in work by a tenth group). Additionally, the example use case also employed novel vascular lumen morphology features and 2D/3D digital edge and texture features which were not employed by other groups. Thus, the example use case employed both a consolidation and an extension of previously developed hand-crafted features. Contrary to previous IVOCT studies, the example use case involved rigorous training/testing of its approach using an expansive dataset comprising both clinical in vivo images and a novel ex vivo dataset, which was validated using 3D cryo-imaging. Classification noise cleaning, using conditional random fields, was implemented to improve the classification results. Finally, the example use case demonstrated proof-of-concept to handshake A-line classification results with plaque boundary segmentation methods to enable fully automated plaque classification and segmentation.

2. A-Line Plaque Classification Algorithm

The A-line plaque classification approach employed in the example use case involved several steps. The input IVOCT images were preprocessed to reduce speckle, correct for catheter optics, and determine an appropriate tissue region for processing, though in other embodiments, one or more of these acts can be omitted. Then, numerous hand-crafted features were extracted, including: vascular lumen morphology, optical physics, A-line peaks, and 2D/3D digital edge and texture (in various embodiments, any combination of one or more of the features discussed herein can be employed). A-lines were classified as fibrolipidic (from the lumen, fibrous tissue followed by lipid), fibrocalcific, or other. Feature selection was used to choose the best features among the large number of proposed features. The example use case compared two distinct multiclass classification strategies: a three-class (3C) approach and dual binary (DB) classifiers (fibrolipidic and fibrocalcific). The 3C approach looked for fibrolipidic and fibrocalcific A-lines simultaneously; the DB classifiers looked for A-lines from the two groups separately, and then merged the results. In both cases, conditional random field postprocessing was used to reduce classification noise, which can optionally be employing in connection with various embodiments discussed herein.

2.1 Preprocessing

Preprocessing on the (r,θ) IVOCT image data consisted of speckle reduction, correction for non-ideal intensities in IVOCT imaging due to optics, and lumen segmentation. Speckle reduction was performed using a Gaussian filter with a sigma of 2.5 and a square kernel of size 7, although greater or lesser values can be employed in various embodiments. Correction for catheter optics was performed using a single-scattering model, described by equations (1)-(3):

$$I(r) = I_0 T(r) S(r) \exp(-u_r r) + I_{off} \qquad (1)$$

$$T(r) = \left[\left(\frac{r-z_0}{z_R}\right)^2 + 1\right]^{-1/2} \qquad (2)$$

$$S(r) = \exp\left[-\left(\frac{r-z_C}{z_W}\right)^2\right], \qquad (3)$$

where r is the imaging depth; I(r) is the detected intensity; $I_0$ is the incident beam intensity; T(r) is the confocal function with $z_0$, the position of the beam waist and with $z_R$, the Rayleigh length; S(r) accounts for the spectral coherence of the source in Fourier-domain OCT with parameters $z_W$ (representing the half-width of the intensity roll-off) and $z_C$ (representing the center of the scan); $I_{off}$ is the baseline intensity, determined experimentally imaging water; and $u_r$ is the characteristic attenuation coefficient specific to each tissue type. For these equations, the following values were used: $z_0$=1.06 mm, $z_R$=0.59 mm, $I_{off}$=6.39, $z_C$=0 mm, and $z_W$=12 mm.

Additional preprocessing steps were used to determine the appropriate Region of Interest (ROI) for classification. Lumen and guidewire segmentations were performed using dynamic programming, with corrections. Following lumen boundary detection, images were pixel shifted to create a vertical lumen border and vertically aligned structures within the wall. For all features except lumen morphology, only the first 1.0 mm (200 pixels) of data in the wall was considered, because this was empirically determined to contain the most relevant information (however, in various embodiments, more data (e.g., providing more information) or less data (e.g., which can improve processing speed) can be used). Although most feature processing was performed on (r,θ) images, (x,y) images were used to compute certain features (e.g., lumen morphology), such as examples discussed in Table 1.

2.2 Classification Feature Extraction

Lumen Morphology

Figure 4:
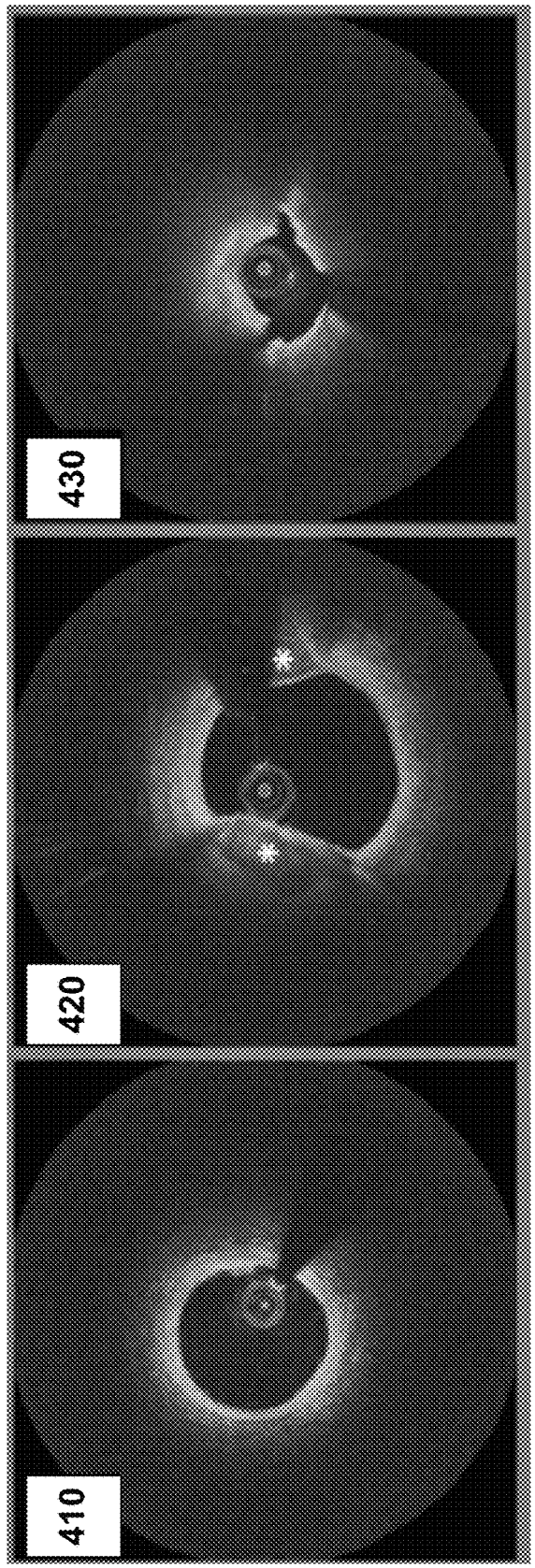
FIG. 4 illustrates an example image of a normal lumen compared with images of non-circular lumens with calcified and lipidous plaques, in connection with various aspects discussed herein.

Lumen morphological features were implemented to describe the size and shape of the lumen, which tends to correlate with hemodynamic shear stress and potentially contributes to atherosclerotic plaque formation. Features were determined from the (x,y) anatomical view. The change in lumen area (ΔLAZ) along the longitudinal (z) direction was computed by comparing the current slice lumen area to each of its adjacent ±3 slices (although various embodiments can use a greater or less number). The absolute lumen area of the current frame was not included, because it depended more on the vessel under study than on disease. Lumen eccentricity was used to assess deviations from a circular shape, as often found in the presence of plaque, as compared with very circular normal regions. Referring to FIG. 4, illustrated is an example image of a normal lumen compared with images of non-circular lumens with calcified and lipidous plaques, in connection with various aspects discussed herein. Image 410 shows a fairly normal, circular lumen. Image 420 shows a very eccentric lumen in vessel containing 2 calcified lesions (indicated via *). Image 430 shows an eccentric lumen with a nearly concentric lipid plaque.

Figure 5:
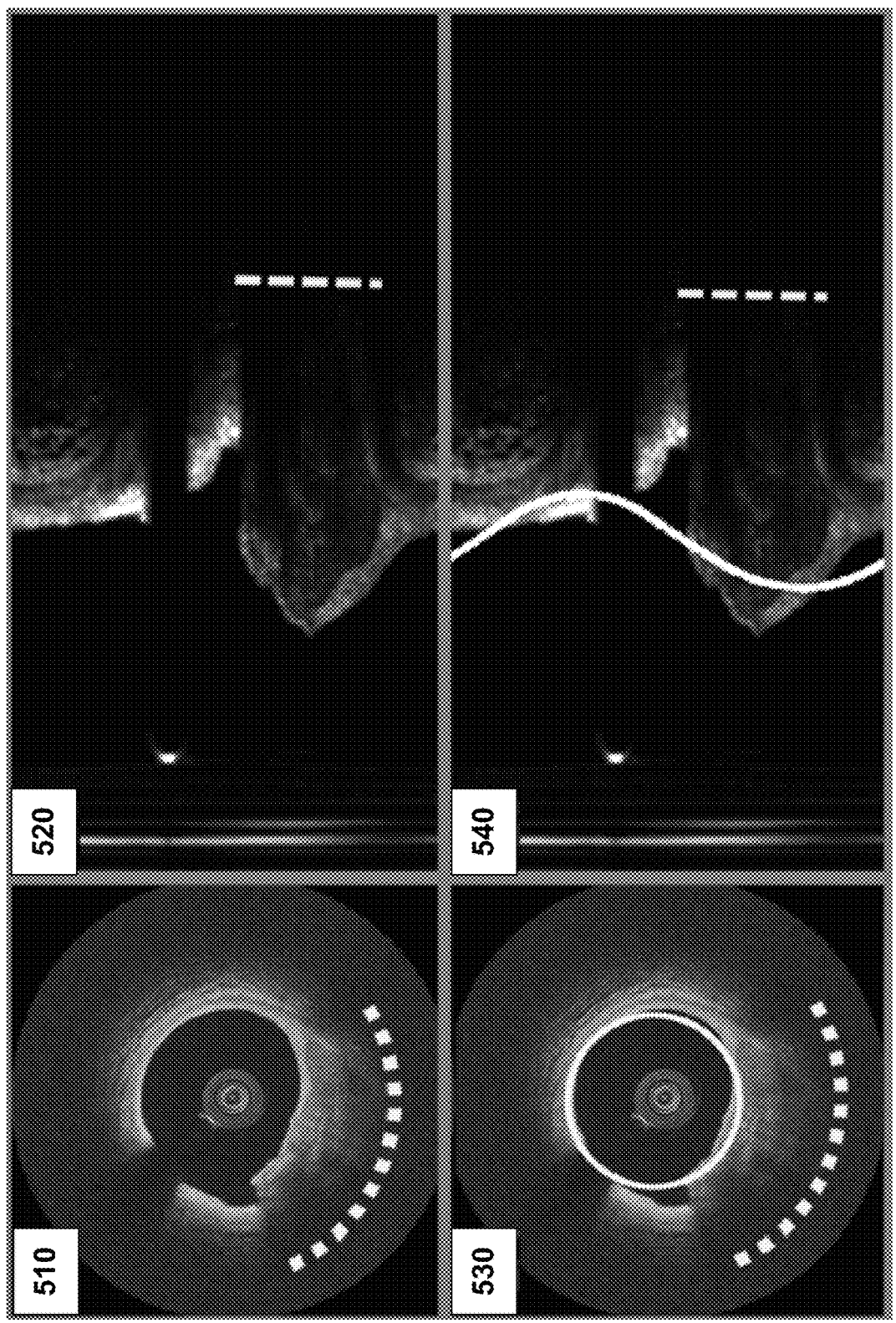
FIG. 5 illustrates example images showing how A-lines containing calcified/lipidic plaque tend to deviate from a circular lumen contour, in connection with various aspects discussed herein.

Frame lumen eccentricity (FLE) was also calculated, which is a single value describing lumen eccentricity in the current frame. FLE is the distance between the foci of the ellipse divided by the ellipse's major axis length. FLE values of 0 and 1 correspond to a circle and a line segment, respectively. The change in frame lumen eccentricity across adjacent slices (ΔFLEz) was computed by comparing the current frame FLE, to the FLE of each of its adjacent ±3 slices (although various embodiments can use a greater or less number). Individual A-line Lumen Eccentricity (ALE) was determined in an effort to localize A-lines containing plaque. Referring to FIG. 5, illustrated are example images showing how A-lines containing calcified/lipidic plaque tend to deviate from a circular lumen contour, in connection with various aspects discussed herein. In FIG. 5, images of a typical vessel with calcified plaques in anatomical (x,y) view (e.g., images 510 and 530) and the corresponding (r,θ) view (images 520 and 540, respectively) are shown. Calcifications are indicated by a dashed line. The top row (510 and 520) shows the nonannotated lumen, and the bottom row shows the vessel with a superimposed circular lumen boundary. Both positive and negative excursions from circularity are seen in 540. To calculate ALE, the center of mass and area of the segmented lumen were determined, then a perfectly concentric circle was created having the same area as the lumen, centered at the center of mass. The signed distance between each A-line lumen boundary point and the corresponding circle boundary along the radius from the center of mass was calculated, giving a vector of ALE values. The mean and standard deviation of ALE were also computed in the 3, 5, 7, 9, and 11 adjacent neighborhoods centered at each A-line (although in various embodiments, only some of these neighborhoods and/or additional neighborhoods can be used). The example use case also computed the change in these values across z, by comparing the values for the same A-line position for each frame, to the values obtained from its adjacent ±3 slices (although various embodiments can use a greater or less number).

Figure 6:
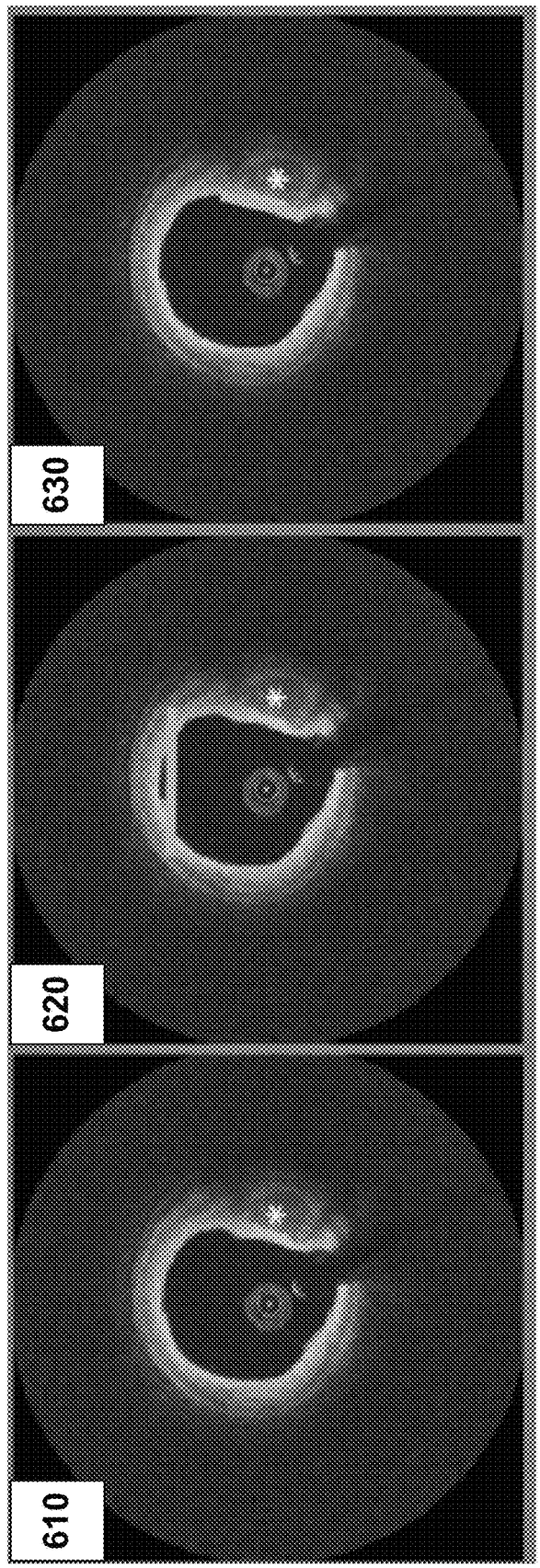
FIG. 6 illustrates example images showing how a linear line segment fit to the lumen border in the anatomical view has a smaller deviation in the calcified region than in more normal tissue, in connection with various embodiments discussed herein.

Because it was noticed that large eccentric calcifications often resulted in a flat lumen in the dataset, a best-fit line was computed for lumen boundary points and corresponding features (sum of squared residuals, goodness of fit, and line magnitude) were extracted based on the residuals between the points and the fitted line. Referring to FIG. 6, illustrated are example images showing how a linear line segment fit to the lumen border in the anatomical view has a smaller deviation in the calcified region than in more normal tissue, in connection with various embodiments discussed herein. Images 610-630 are an anatomical (x,y) IVOCT image containing calcium plaque (indicated via *). Image 610 shows the original image, image 620 shows a best-fit line using ⅛ of the points around the lumen border centered on the normal region, and image 630 shows the same line length fit to the calcified region. The example use case also compared the values for the same A-line position for each frame with the values obtained from its adjacent ±3 slices (although various embodiments can use a greater or less number). These features are summarized in Table 1, below.

Figure 7:
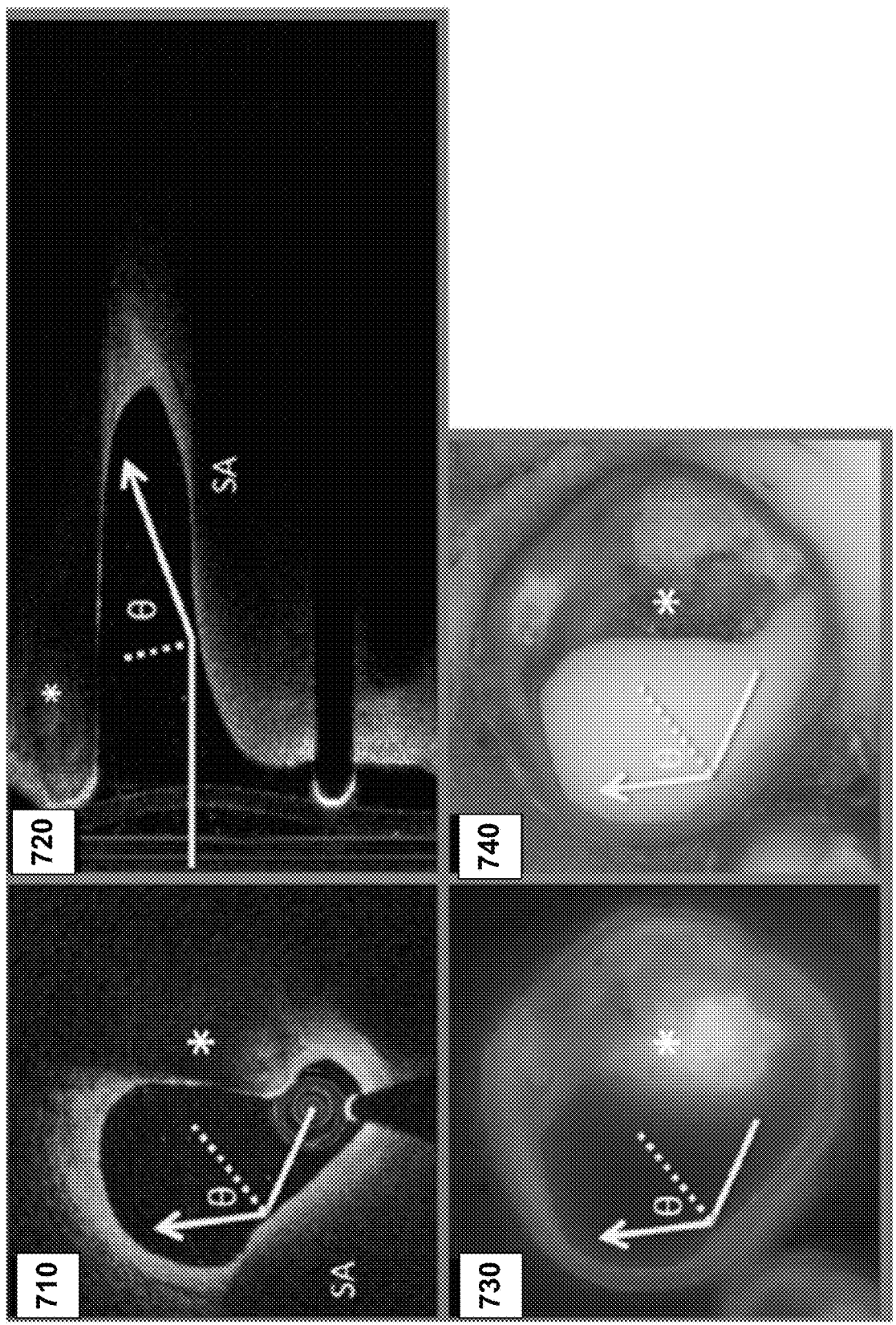
FIG. 7 illustrates example images showing how oblique beam incidence due to an eccentric catheter can cause superficial attenuation (SA) of the intravascular optical coherence tomography (IVOCT) signal, in connection with various embodiments discussed herein.

The last lumen morphological feature is R-θ Lumen Curvature. Referring to FIG. 7, illustrated are example images showing how oblique beam incidence due to an eccentric catheter can cause superficial attenuation (SA) of the IVOCT signal, in connection with various embodiments discussed herein. Image 710 shows an anatomical (x,y) IVOCT image with the corresponding R-θ view shown in image 720 of the vessel, containing calcified plaque (indicated via *). Corresponding fluorescence and grayscale cryo-images are shown at 730 and 740, respectively. The arrows in 710-740 show the trajectory of the IVOCT signal from the imaging catheter. The superficial attenuation (SA) of the IVOCT signal was observed near the point of entry. This could potentially be misconstrued as attenuating plaque, although no plaque is present. This SA region in the IVOCT image is near a high gradient of the lumen boundary, as can be seen in 720. Although listed in the morphological group, this feature could also be considered in the optical group. A region from an IVOCT image can appear dim, not because of the presence of plaque, but because the IVOCT imaging beam is obliquely incident on the tissue surface resulting in light being reflected away from the transducer. As a surrogate, the lumen slope was computed in (r,θ) images, where a slope of 0 corresponds to a vertical lumen boundary giving a perpendicular incidence of the beam on the tissue. Large positive or negative slopes corresponded to an oblique angle of incidence.

TABLE 1

Lumen Morphological Features

| Feature | Description |
|---|---|
| Change in lumen area ($\Delta LA_Z$) | $\Delta LAZ$ = lumen area of the current slice − lumen area of adjacent ±1, 2, and 3 slices |
| Frame Lumen Eccentricity (FLE) | FLE = distance of foci of the ellipse/major axis length (An ellipse whose eccentricity is 0 is actually a circle, whereas an ellipse whose eccentricity is 1 is a line segment.) |
| Change in Frame Lumen Eccentricity across z ($\Delta FLE_Z$) | $\Delta$ FLE = FLE of the current slice − FLE of its adjacent ±1, 2, and 3 slices |
| A-line Lumen Eccentricity (ALE) | ALE = lumen boundary − circle boundary See FIG. 3. We assessed both mean and standard deviation of ALE in the surrounding 3, 5, 7, 9 and 11 A-line neighborhood, centered at each A-line |
| $\Delta ALE_Z$ = ALE − $ALE_{nextSlice}$ | Change in the ALE, Mean ALE and the Standard Deviation ALE in the surrounding 3, 5, 7, 9 and 11 A-line neighborhood, across the adjacent ±1, 2, and 3 slices |
| Anatomical View Lumen Curvature | Local curvature of the A-line in the anatomical, XY coordinate frame (FIG. 5). Finds how much a segment of the vessel deviates from linearity because eccentric calcium tends to cause an eccentric lumen shape. Local curvature at 1/8, 1/16, and 1/32 of the lumen angular circumference. For each line segment, we compute the sum of square residuals, goodness of fit, and magnitude of the vector. |
| R-θ Lumen Curvature (angle of incidence) | Local curvature of the A-line in the r-θ coordinate frame (FIG. 4). Highly sloped lumens in the R-θ image are indicative of an oblique imaging beam angle of incidence. This contributes to a decrease in the IVOCT image intensity. |

Optical

Figure 8:
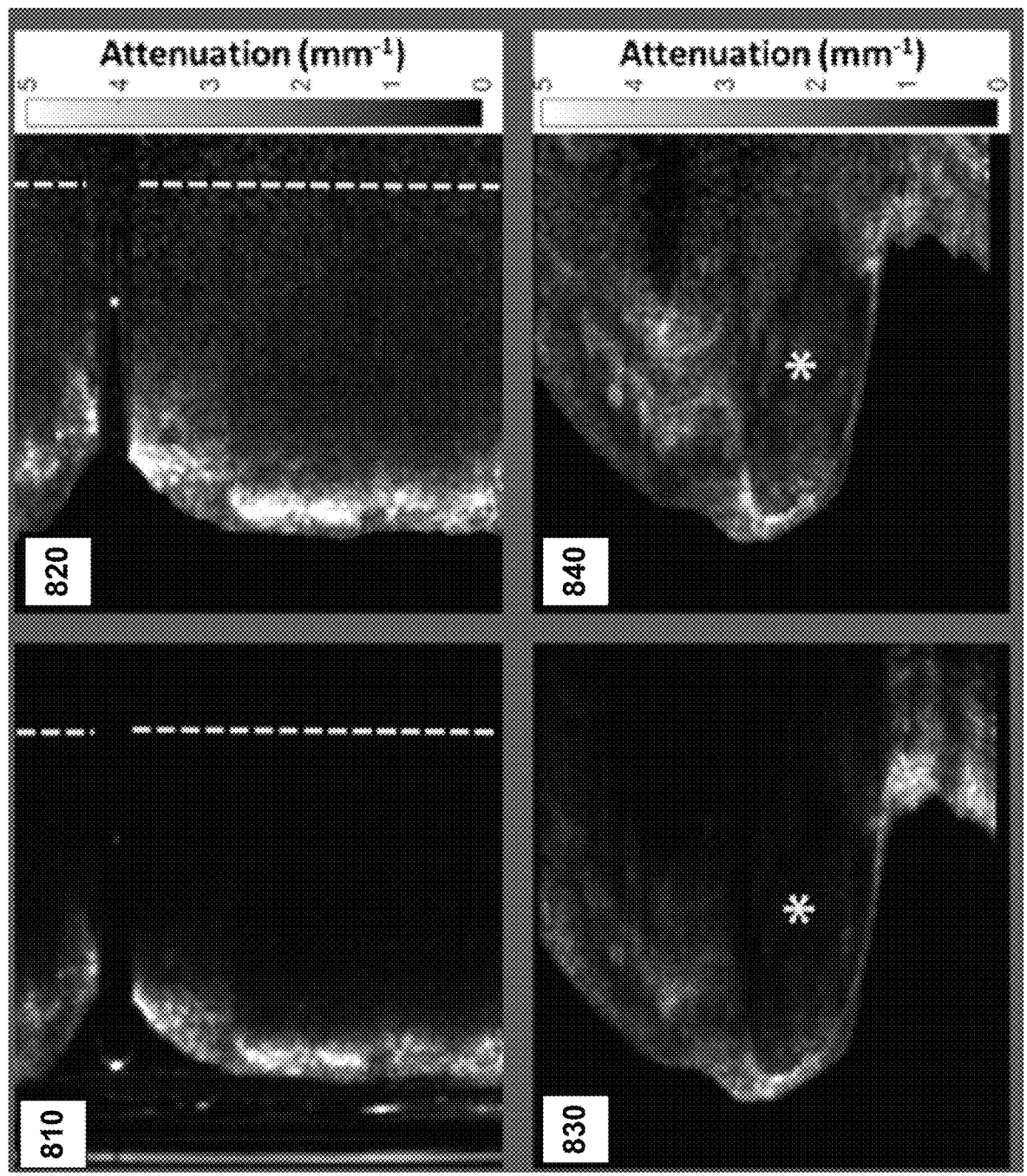
FIG. 8 illustrates example images showing optical attenuation maps of coronary plaques, in connection with various aspects discussed herein.

The optical features implemented were inspired by the physics of IVOCT image acquisition and the tissue optical properties characteristic of each plaque type. Optical attenuation was included, calculated as described below. Referring to FIG. 8, illustrated are example images showing optical attenuation maps of coronary plaques, in connection with various aspects discussed herein. Representative fibrolipidic (images 810) and fibrocalcific (image 830) plaques are shown in the (r,θ) view. Images 810 and 830 show intensity images and images 820 and 840 show corresponding attenuation maps, as obtained using the method discussed below. Lipid plaques (dashed line) tend to have high attenuation near the fibrolipid boundary. Calcified plaque (asterisk) tend to have lower attenuation values, as compared to surrounding fibrous tissue. The example use case employed determined the optical attenuation using a discretized differential equation (equation (4)) to solve the optical attenuation at each pixel:

$$\mu(i) \approx \frac{I[i]}{2\Delta \sum_{i+1}^{\infty} I[i]} \quad (4)$$

where $\mu(i)$ is the attenuation at a given pixel, $I[i]$ is the intensity at the given pixel, $\Delta$ is the pixel size, and the summation is the sum of all intensities "deeper" than the current voxel.

Intensity features for each A-line were extracted from linear data, as tissues with heavily calcified or lipid tissues are expected to have low image intensities. For intensity and optical attenuation computation, the mean, median, standard deviation, minimum, maximum, skewness, and kurtosis values were calculated over the following ranges of tissue, observed immediately after the lumen boundary: 0.0-0.25 mm; 0.25-0.5 mm; 0.5-0.75 mm; 0.75-1.0 mm, as well as over the total 1.0 mm.

Additional optical features were included. For each A-line, the distance between the catheter and the lumen boundary was obtained, because larger distances could contribute to diminished image intensity. The distance to background intensity describes the depth at which the signal reached a value for background. This value was determined by starting at the far depth of the image and searching toward the lumen to find the first pixel above this threshold. This feature should detect highly attenuating fibrolipidic regions, which are consistent with a rapid decay of the IVOCT signal.

Table 2, below, shows optical tissue properties and geometric features employed in the example use case.

TABLE 2

Optical Tissue Properties and Geometric Features

| Feature | Description |
|---|---|
| Image intensity | Investigated on both the linear and log transformed data |
| Optical attenuation | Calculated using Vermeer's methodology |
| Distance between catheter and lumen boundary | Accounts for intensity variations due to large distances between imaging catheter and tissue interface |
| Distance to background intensity | Describes how fast the signal falls to the baseline intensity, which is determined by Otsu's method using 210 bins |

A-Line Peaks

Figure 9:
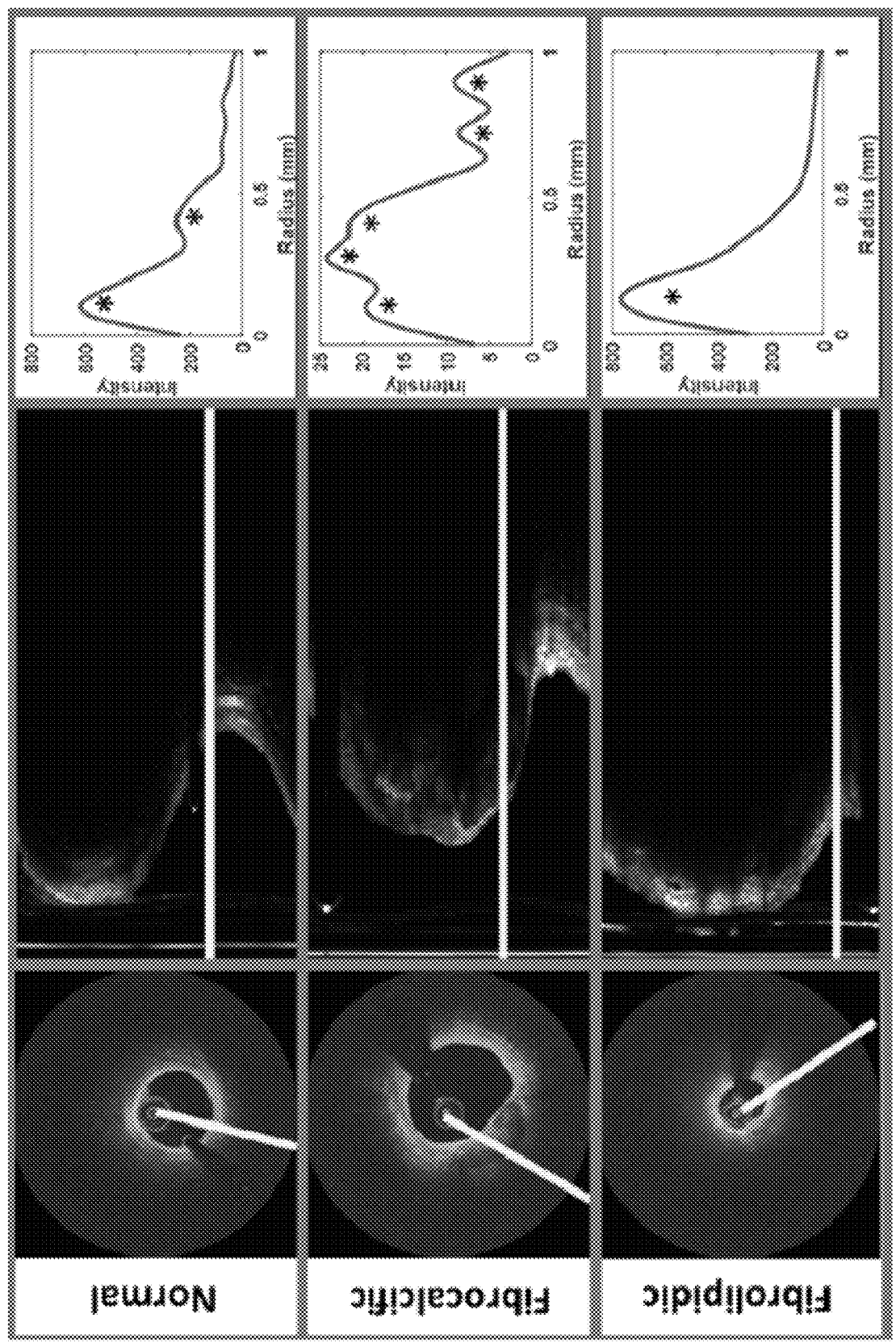
FIG. 9 illustrates example images and corresponding A-line intensity graphs showing how A-line peak features can facilitate discrimination between fibrocalcific, fibrolipidic, and "other" A-lines, in connection with various embodiments discussed herein.

Prominent peaks in each IVOCT A line were analyzed, which tend to correlate with plaque type. Referring to FIG. 9, illustrated are example images and corresponding A-line intensity graphs showing how A-line peak features can facilitate discrimination between fibrocalcific, fibrolipidic, and "other" A-lines, in connection with various embodiments discussed herein. Example A-lines are plotted as radial lines in the (x,y) images in the left column, as horizontal lines in the corresponding (r,θ) images in the center column, and displayed graphically in the right column. Peaks are denoted by asterisks (*). Normal vessels (top row) have two characteristic peaks corresponding to the initial intimal and back adventitial borders (as seen in the example graph in the top right). Further, the signal appears to be monotonically decreasing. Lipid lesions (middle row) tend to have one characteristic peak followed by a fast decay of the signal (as seen in the example graph in the middle right). Fibrocalcific A-lines (bottom row) tend to have a variety of peaks, and a signal without a monotonic decrease (as seen in the example graph in the bottom right). Briefly, A-lines corresponding to normal tissue have a prominent first and second peak, and the signal tends to monotonically decrease. Fibrocalcific A-lines have several prominent peaks, and the signal does not decay monotonically. Finally, fibrolipidic A-lines tend to have only one prominent peak near the A-line boundary, and then the signal rapidly decays to baseline intensity. For the example use case, each A-line was low-pass filtered using a zero-phase shift FIR filter with order 50 and cutoff frequencies of 0.1 and 0.01 of units 1/pixel (pixel size ~5 μm), although various embodiments can use greater or lesser order and/or cutoff frequencies. The cutoff frequency affects smoothing of the signal. To identify local peaks, the example use case employed the findpeaks function in Matlab with a minimum intensity difference required of $10^{-4}$ between a peak and its neighbors (although the minimum intensity difference can vary in various embodiments). Several features were determined, as described in Table 3.

TABLE 3

A-Line Peak Analysis Features.

| Feature | Description |
| --- | --- |
| Number of Prominent Peaks | Number of peaks above empirically determined thresholds of: 0, 50, 100, 150, 200, 250, 300, 350, 400, and 450. |
| Euclidean Distance between peaks 1, 2, and 3 Width of peaks 1, 2, and 3 Prominence peaks 1, 2, and 3 Location of peaks 1, 2, and 3 | The first three peaks are most informative for discrimination between normal and plaque: thus, we thoroughly investigated their individual characteristics and mutual relationships. |
| Polynomial curve fitting | Coefficients of third-order polynomials fitted to the entire 1D signal, starting at the initial peak |
| Location when signal falls below threshold intensity | This describes when the signal first drops below a baseline value. Thresholds were set at 50, 100, 150, 200, 250, 300, 350, and 400 |
| Area | Integration of total area under the A-line curve |

Digital Edge and Texture

The example use case employed 2D digital edge and texture features because calcified plaques tend to have visually pronounced edges and a more prominently textured appearance than lipidous plaques. Several texture features came from the Leung-Malik filter bank, which is a multi-scale, multi-orientation filter bank containing 48 filters, including multi-orientation edge, Gaussian, and Laplacian of Gaussian filters. The example use case also used the Schmid filter bank, which consists of 13 rotationally invariant filters. Finally, edge gradients were added (e.g., Laplacian, horizontal and vertical Sobel, and horizontal and vertical Prewitt). The parameters used in the example use case for each kernel are presented in Table 4; however, these parameters can be varied in various embodiments. To process these 2D features, all helically sampled A-lines over a large vessel segment were merged to form a large 2D (r,θ) array, for example consisting of about 50,000×1000 pixels for a 100-frame segment. As described previously, the array was pixel shifted and only the first 1.0 mm of tissue in the wall was filtered. This image is referred to herein as $Concatenated_{R\theta}$. This image was then convolved with the various 2D digital edge/texture filters to derive the filter responses. The mean, median, standard deviation, minimum, maximum, skewness, kurtosis, and energy values were computed over the following ranges of tissue: 0.0-0.25 mm; 0.25-0.5 mm; 0.5-0.75 mm; 0.75-1.0 mm, as well as over the total 1.0 mm.

TABLE 4

2D Digital Edge and Texture Features.

| Feature | Description |
| --- | --- |
| Leung-Malik Filter Bank | Multi-scale, multi-orientation filter bank that contains 48 edge, bar, and spot features |
| Schmid Filter Bank | 13 rotationally invariant filters |
| Laplacian | Applied Laplacian filter with the following values for sigma: [0.5, 1.0, 1.5, 2.0, 2.5, 3.0]; |
| Laplacian of Gaussian | Applied Laplacian of Gaussian filter with the following values for sigma: [0.01, 0.2, 0.4, 0.7] |
| High Pass | Image—Gaussian blurred image with the following values for sigma: [0.5, 1.0, 1.5, 2.0, 2.5, 3.0] |
| Sobel | Horizontal and vertical edge gradient |
| Prewitt | Horizontal and vertical edge gradient |
| Local Entropy | Local entropy at bin sizes: [5 × 5], [9 × 9], [11 × 11], [15 × 15], |
| Local Standard Deviation | Local standard deviation at bin sizes: [3 × 3], [5 × 5], [7 × 7], [9 × 9], [11 × 11] |
| Local Range | Local range at bin sizes: [3 × 3], [5 × 5], [7 × 7], [9 × 9], [11 × 11] |

The example use case also implemented 3D digital edge and texture features (e.g., Laplacian, Laplacian of Gaussian, Sobel, and Prewitt). To do this, the $Concatenated_{R\theta}$ image was reshaped to form a 3D (r,θ,z) matrix, and this image was convolved with the various 3D digital/edge filters from the filter bank. Following 3D convolution, the (r,θ,z) matrix was reshaped back to the $Concatenated_{R\theta}$ image, and feature values were calculated in the same manner as for the 2D features above. The descriptions of the 3D digital edge and texture features employed in the are summarized in Table 5.

TABLE 5

3D Digital Edge and Texture Features.

| Feature | Description |
| --- | --- |
| Laplacian | Applied 3D Laplacian; kernel size 3 × 3 × 3 |
| Laplacian of Gaussian | Applied Laplacian of Gaussian filter with following values: sigma = [0.5, 1.0, 1.5, 2.0, 2.5, 3.0] |

TABLE 5-continued

3D Digital Edge and Texture Features.

| Feature | Description |
|---|---|
| High Pass | Image—Gaussian blurred image with the following values: sigma = [0.5, 1.0, 1.5, 2.0, 2.5, 3.0] |
| Sobel | X, Y, and Z direction, magnitude, azimuth, elevation |
| Prewitt | X, Y, and Z direction, magnitude, azimuth, elevation |

2.3 Classification Model Development

The example use case evaluated two multiclass classification approaches. First, a three-class (3C) approach was created, in which A-lines were categorized into one of three classes: fibrolipidic, fibrocalcific, or other. The example use case tried using a random forest classifier (3C-RF), with a maximum number of 20 splits, and 30 learners (in various embodiments, a greater or lesser number of splits and/or learners can be employed). The example use case also tried using a one-versus-all support vector machine (3C-SVM) classifier with a Gaussian radial basis function kernel. The box constraint was empirically determined as 1.0, and a heuristic search approach in Matlab was used to automatically determine the manual kernel scale. In both cases, feature selection was employed to reduce overfitting.

As an alternative multiclass classification approach, the example use case also used dual binary (DB) classifiers, where one classifier was used to classify A-lines as fibrolipidic vs. other, and the other classifier was used to categorize A-lines as fibrocalcific vs. other. For the DB approach, as compared with the 3C approach, feature selection was carried out independently for each of the two classifiers. Moreover, for each DB classifier, the training data were skewed, such that half the training data belonged to the plaque type of interest, whereas the remaining half of the data came from the other two categories. With the DB approach, there is a chance that both the fibrolipidic and fibrocalcific classifiers will claim ownership of an A-line. This situation is addressed as described below following classification noise cleaning. For each DB classifier, the example use case tried using both random forests (DB-RF) and support vector machine (DB-SVM), with the same parameters as for the 3C approach, and compared classification results.

Feature Selection

It was anticipated that some features would be either inconsequential or redundant, especially given the expansive edge and texture filter banks implemented for feature extraction. Therefore, feature selection was used on each group of features. For the 3C approaches, minimal-redundancy-maximal-relevance (mRMR) was used to identify features that best discriminated all three classes. For the DB approach, both mRMR and the binary Wilcoxon method were tried. In all cases, feature selection was used to rank order the features (from best to worst) in each group. Next, forward feature selection was performed, starting with an empty subset and gradually adding features (starting with the highest ranked features) to train the classifiers. The "stopping rule" for adding features was when a plot of classification true positive rate plateaued. Finally, the best features from each group were combined to form the total feature subset. Note that each classifier developed for the example use case had its own unique set of features.

Feature Normalization

Classification features were normalized to ensure that each one had an equal effect on classifier performance. Features were normalized by the mean and standard deviation of the range of values of each feature, as observed over the training set. This is also referred to as the statistical z-score. The example use case compared normalizing each feature across the range of values observed within each individual vessel with normalizing across the range of values observed over all vessels. When normalizing across the ranges observed in all vessels, in vivo features and ex vivo features were normalized separately.

Classification Noise Cleaning

The example use case implemented a fully connected conditional random field (CRF) model for classification noise cleaning of the results following initial A-line classification. The advantage of a fully connected CRF is that it establishes pairwise potentials on all pairs of pixels in an image. This means it performs classification noise cleaning by considering how all pairs of pixels in an image interact with one another. This is logical in connection with vascular plaques, as plaque types are expected to have volumetric continuity. Therefore, the example use case employed CRF on the en face (θ,z) view of the classification results, as this representation shows the classification results for all A-lines within an IVOCT pullback segment in a single 2D view.

The fully connected CRF employed in the example use case modifies the classification results using a Gibbs distribution over a random field X, which is defined over a set of variables $\{X_1, \ldots, X_N\}$. The corresponding Gibbs energy for the complete graph on X is as in equation (5):

$$E(x) = \sum_i \psi_u(x_i) + \sum_{i<j} \psi_p(x_i, x_j) \quad (5)$$

where i and j range from 1 to N, $\psi_u(x_i)$ is the unary potential, which corresponds to the classification probabilities derived from the classifier, and $\psi_p(x_i,x_j)$ represents the pairwise potentials in the mode. The pairwise potentials have the form shown in equation (6):

$$\psi_p(x_i,x_j)=\mu(x_i,x_j)k(f_i,f_j) \quad (6)$$

where μ is a simple label compatibility function that is equal to 1 when the labels for $x_i$ and $x_j$ are different and equal to 0 otherwise. For multiclass, color image segmentation and labeling, k is defined by the two-kernel potential of equation (7):

$$k(f_i, f_j) = \omega^{(1)}\exp\left(-\frac{|p_i - p_j|^2}{2\sigma_\alpha^2} - \frac{|I_i - I_j|^2}{2\sigma_\beta^2}\right) + \omega^{(2)}\exp\left(-\frac{|p_i - p_j|^2}{2\sigma_\gamma^2}\right) \quad (7)$$

where $I_i$ and $I_j$ are color RGB vectors, $p_i$ and $p_j$ are positions, $\omega^{(1)}$ and $\omega^{(2)}$ are weighting parameters, $\sigma_\alpha$ and $\sigma_\gamma$ control the amount of nearness, and $\sigma_\beta$ controls the amount of color similarity. The kernel governed by $\omega^{(1)}$ corresponds to the "appearance" kernel, which biases the result to apply the same label to pixels that are nearby and have a similar color. The kernel governed by $\omega^{(2)}$ corresponds to the "smoothness" kernel, which biases the results to get rid of small isolated regions.

The example use case only made use of the smoothness kernel because, for the example use case, the intensity information was not conveyed in the en face view to the CRF algorithm (however, various embodiments can employ intensity information in a similar CRF algorithm). This was done by setting $\omega^{(1)}=0$, which simplifies equation (7) to equation (8):

$$k(f_i, f_j) = \omega^{(2)} \exp\left(-\frac{|p_i - p_j|^2}{2\sigma_\gamma^2}\right) \quad (8)$$

Thus, the CRF implementation of the example use case only involved optimizing two parameters corresponding to the smoothness kernel: $\omega^{(2)}$ and $\sigma_\gamma$. This was done by using a grid search approach with empirically determined values for each parameter (as a result, these can vary from the values provided herein for various embodiments, e.g., based on different training datasets). The values for $\omega^{(2)}$ were set as 0.25:0.25:1. Because $\sigma_\gamma$ controlled the degree of smoothness in both the θ and z directions of the en face image, each direction was optimized separately. In the θ-direction, the values for $\sigma_\gamma$ were set as 0.5:0.5:1.5. Similarly, in the z-direction, the range of values for $\sigma_\gamma$ were set as 0.5:0.5:1.5. These parameters were optimized by applying the classifier to all data from one of the folds in the training set. Because the example use case employed the efficient inference in the fully connected CRF implementation, the algorithm used an iterative mean field approximation to the CRF distribution. For the example use case, the number of iterations was set to 100.

For the 3C results, CRF processing was only used once. For the DB approaches, CRF processing was applied to the fibrolipidic classification results and the fibrocalcific classification results separately. Finally, the cleaned fibrolipidic and fibrocalcific results were merged. In the event that an A-line was classified as both fibrolipidic and fibrocalcific, the A-line was classified based on the plaque type with the maximum probability from the initial classification.

3. Experimental Methods 3.1 Creation of Training and Validation Database

The example use case employed both a clinical in vivo and a novel ex vivo dataset, validated by 3D cryo-imaging/histology. In vivo IVOCT pullbacks were obtained from the University Hospitals Cleveland Medical Center (UHCMC) imaging library. All pullbacks were imaged before the interventional procedure. IVOCT images were collected using a frequency domain OCT system (Ilumien Optis; St. Jude Medical, St. Paul, Minn., USA), which consists of a tunable laser light source sweeping from 1250 to 1360 nm at a frame rate of 180 fps, a pullback speed of 36 mm/s, and an axial resolution of about 20 μm. A total of 6556 image frames across 111 segments from 49 patient pullbacks were analyzed. Each polar (r,θ) image consisted of either 448 or 496 A-lines, 968 pixels along each A-line, and 16 bits of grayscale data per pixel. The ex vivo dataset consisted of 440 IVOCT images from 10 segments, taken from 10 pullbacks. Briefly, the ex vivo coronary arteries were obtained from the Cuyahoga County Coroner's office from human cadavers within 72 hours of death. IVOCT image acquisition was performed using a LightLab C7-XR Fourier Domain IVOCT Intravascular Imaging System (C7-XR; LightLab Imaging Inc., MA). Pullbacks were performed at 10.0 or 20.0 mm/s using 50,000 A-lines per second, yielding 5.4-cm pullbacks at 100- or 200-μm frame intervals. Each polar (r,θ) image consisted of either 1008 or 504 A-lines, 984 pixels along each A-line, and 16 bits of grayscale data per pixel. Each ex vivo IVOCT image in the dataset had a corresponding registered cryo-image. Registration between IVOCT pullbacks and corresponding cryo-image volumes was performed using a registration method developed in work associated with various embodiments discussed herein.

Figure 10:
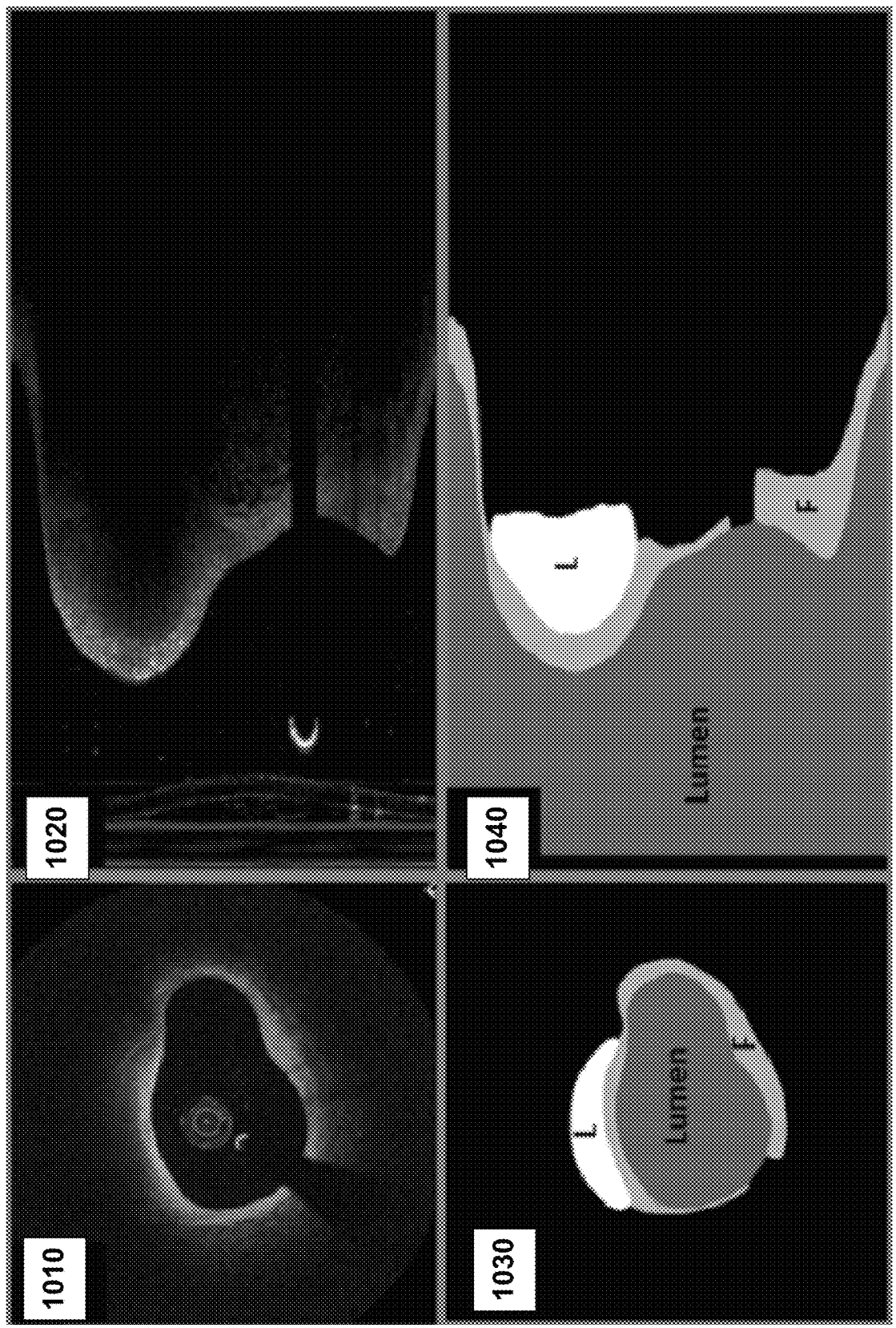
FIG. 10 illustrates example images showing conversion of expert annotation labels from anatomical (x,y) to (r,θ) representation, in connection with various embodiments discussed herein.

All images were annotated to identify fibrocalcific or fibrolipidic A-lines. Annotations were performed on the anatomical Cartesian (x, y) view using Amira (Thermo-Fisher). Because a number of the classification feature computations took place on the polar r-θ coordinate frame, the labels were also converted from anatomical (x,y) to their respective r-θ coordinates. Referring to FIG. 10, illustrated are example images showing conversion of expert annotation labels from anatomical (x,y) to (r,θ) representation, in connection with various embodiments discussed herein. The top row shows the original (x,y) image 1010 and its corresponding (r,θ) representation 1020. Expert annotations are performed in the (x,y) representation (image 1030). Example image 1030 shows the lumen, fibrous tissue (marked "F"), and a lipidic region (marked "L"). Note that the back edge of the lipidic region was approximated by the analyst. Image 1040 shows the transformation of the annotations to the (r,θ) representation. Note that to match the raw r-θ data, the imaging medium index of refraction and the z-offset correction should be taken into account. Ex vivo images were annotated by a single expert who referenced the corresponding registered cryo-images. In vivo images were annotated by the consensus decision of two expert IVOCT readers. The readers were trained in the UHCMC, a laboratory that has conducted numerous studies requiring an expert reading of IVOCT images. Consensus descriptions of plaque appearance in the IVOCT images governed determination of the ground truth labels. For example, a fibrocalcific plaque appears as a high-backscattering and relatively homogeneous region (fibrous tissue) followed by a signal-poor region with sharply delineated front and/or back borders (calcium) on IVOCT images. A fibrolipidic region was defined as fibrous tissue followed by a fast signal dropoff with diffuse borders corresponding to the presence of a necrotic core or lipid pool. A-lines that did not meet the criteria of either class were categorized as "other."

3.2 A-Line Plaque Classification Experiments

Classification Training Using In Vivo and Ex Vivo Datasets

Classification algorithms were developed using fivefold cross-validation across training data. A held-out test set was used to mitigate the risk of artificially high classification performance due to overfitting. Training data consisted of 4819 in vivo images across 89 segments from 41 patients, and 440 ex vivo images across 10 vessel segments from 10 cadaver coronary arteries. The held-out test set consisted of 1737 in vivo images across 22 segments from eight patients. Each training fold was divided to ensure that all data from a particular patient were entirely contained within one fold. No patient data from the held-out test set were contained in any of the training folds or vice versa. In each fold, 45,000 A-lines were used for training and 15,000 A-lines were used for testing. A-lines were evenly spaced along the folds. The training A-lines were balanced for each class (15,000 fibrolipidic, 15,000 fibrocalcific, and 15,000 other for the 3C approaches; 22,500 fibrolipidic/fibrocalcific and 22,500 equally sampled from the remaining two classes for the DB approaches). Classification true positive rates were reported (discussed in greater detail below) on the balanced training data and from all the A-lines on the held-out test set in classification confusion matrices. In addition to the confusion matrices on the total A-lines, plaque angle assessments were compared between the automated and ground-truth methods using Bland-Altman analysis.

The example use case had both in vivo and ex vivo data in the training set. Of the 45,000 A-lines in each training fold, 15,000 came from the ex vivo data, whereas the remaining came from the in vivo data. Because there were a limited number of ex vivo data, a fivefold cross-validation training algorithm was designed such that each fold contained all the ex vivo training data and ⅘ of the available in vivo training data. One-fifth of the in vivo data was replaced each time, whereas the same ex vivo data were present in each train fold. Finally, the classifier was trained using samples obtained across all the training data and its performance was assessed on the held-out in vivo test set. Note that both the training and held-out test cases were completely separate. Thus, the held-out test cases had no effect on determining appropriate features or optimization of the classifier.

Transition of Classification Output to Segmentation Algorithms

The example use case demonstrated proof-of-concept for streamlining A-line plaque classification results into semi-automated algorithms for fibrocalcific and fibrolipidic boundary segmentation. One representative fibrocalcific case and one representative fibrolipidic case were selected from the held-out in vivo test set to assess implementation. For each vessel, only one plaque type was displayed. Lumen, guidewire, and back boundary segmentation were input. For the fibrolipidic case, angular plaque boundaries that were automatically determined by the classifier were input into a dynamic programming algorithm designed to find the boundary between the fibrous and lipidic tissue. The same procedure was repeated for the fibrocalcific case, but using a fibrocalcific boundary segmentation algorithm. The resulting plaque boundaries and volume renderings across the images were assessed.

3.3 Classification Software Implementation

The computation software was developed on a Dell Precision T7610 with an Intel® Xeon® CPU E5-2650 v2 with a 2.60 GHz processor. The computer operated 64-bit Windows 7 Professional with 128 GB of RAM and an NVIDA Quadro K4000 video card. Image analysis and classification software was performed in Matlab® 2016B (Mathworks, Natick, Mass.).

4. Results 4.1 A-Line Classification Results

Figure 11:
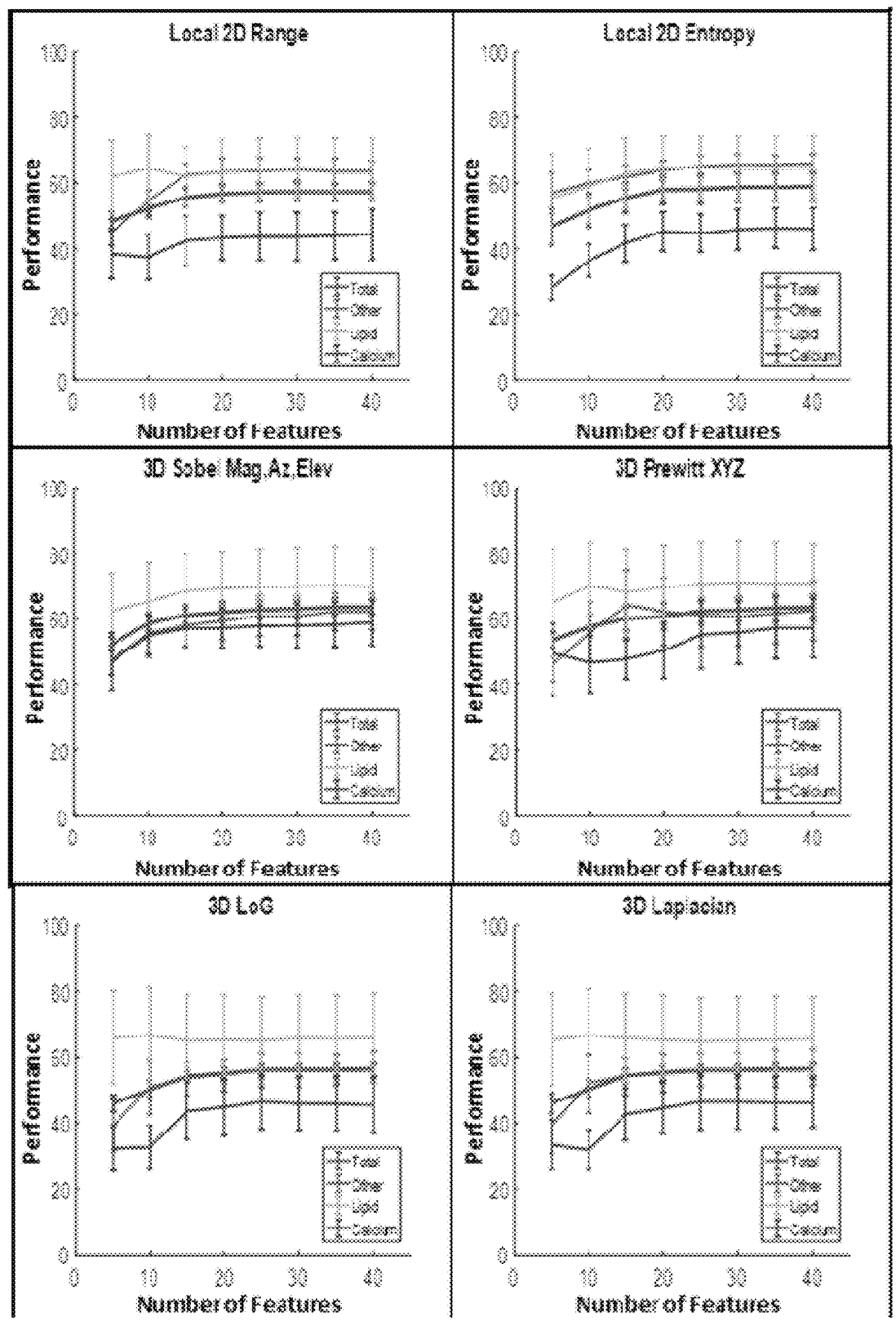
FIG. 11 illustrates Three Class Support Vector Machine (3C-SVM) feature selection plots for local 2D range, local 2D entropy, 3D Sobel (r,θ,z), 3D Prewitt (x,y,z), 3D Laplacian of Gaussian, and 3D Laplacian, in connection with various embodiments discussed herein.
Figure 12:
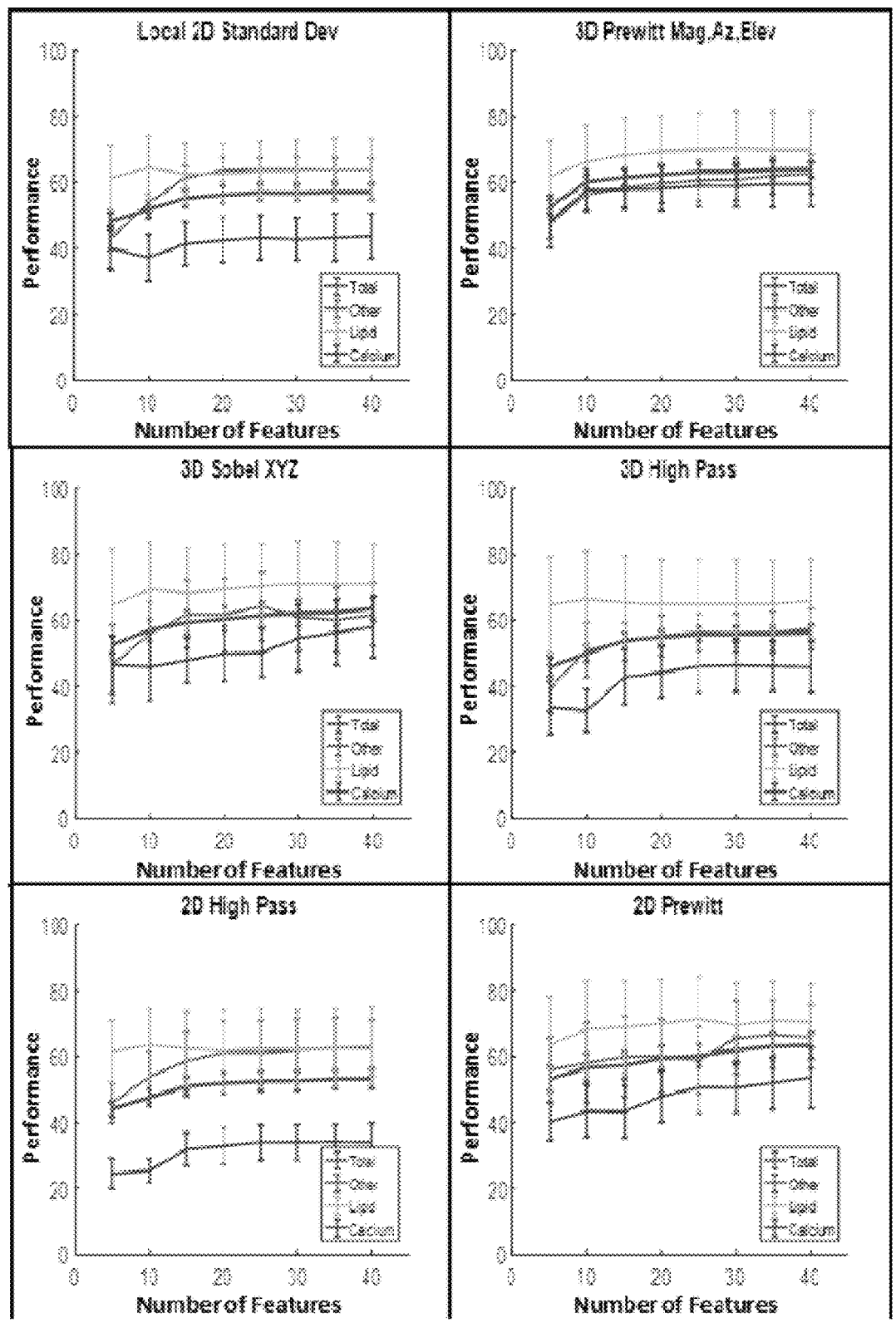
FIG. 12 illustrates 3C-SVM feature selection plots for local 2D standard deviation, 3D Prewitt (r,θ,z), 3D Sobel (x,y,z), 3D high pass, 2D high pass, and 2D Prewitt, in connection with various embodiments discussed herein.
Figure 13:
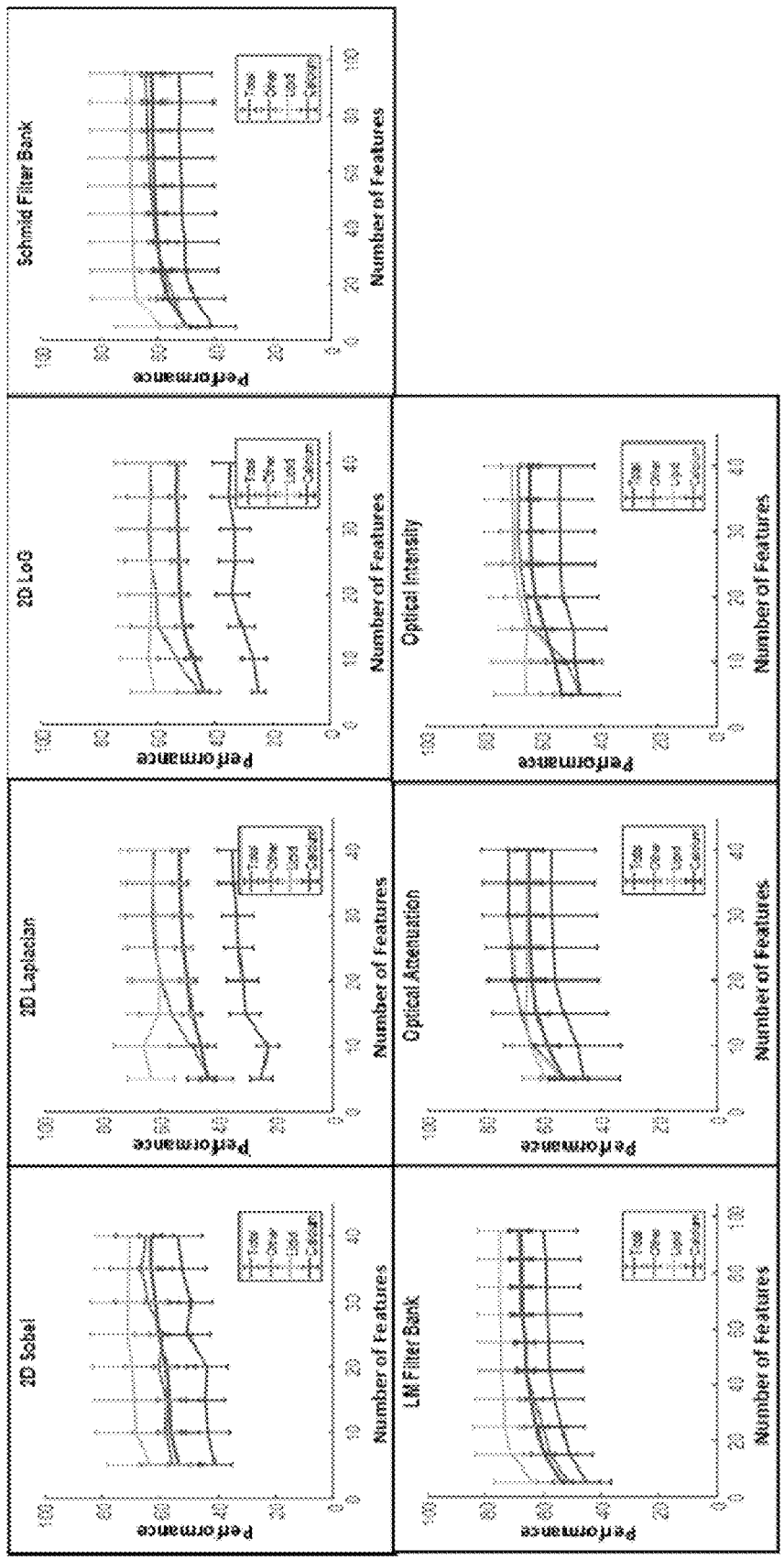
FIG. 13 illustrates 3C-SVM feature selection plots for 2D Sobel, 2D Laplacian, 2D Laplacian of Gaussian, Schmid Filter Bank, Leung-Malik Filter Bank, Optical attenuation, and Optical intensity, in connection with various embodiments discussed herein.

Feature selection was performed to find the optimal number of features in each feature subgroup. Feature selection plots are shown in FIGS. 11-13 for the 3-class support vector machine (3C-SVM) as applied to different feature groups. Feature selection for each feature group (e.g., as discussed at Section 2.2) was performed to determine the optimum number of features. Feature plots include both overall accuracy ('Total') and the true positive rates for each plaque type ('Other', 'Lipid' for fibrolipidic, and 'Calcium' for fibrocalcific) vs. the number of features. For the example use case, the optimum number of features for each group was manually selected as the curves approached a plateau, but automatic selection could be employed in various embodiments. As an example, N=30 was chosen for the Local 2D Range group in FIG. 11. Referring to FIG. 11, illustrated are 3C-SVM feature selection plots for local 2D range, local 2D entropy, 3D Sobel (r,θ,z), 3D Prewitt (x,y,z), 3D Laplacian of Gaussian, and 3D Laplacian, in connection with various embodiments discussed herein. Referring to FIG. 12, illustrated are 3C-SVM feature selection plots for local 2D standard deviation, 3D Prewitt (r,θ,z), 3D Sobel (x,y,z), 3D high pass, 2D high pass, and 2D Prewitt, in connection with various embodiments discussed herein. Referring to FIG. 13, illustrated are 3C-SVM feature selection plots for 2D Sobel, 2D Laplacian, 2D Laplacian of Gaussian, Schmid Filter Bank, Leung-Malik Filter Bank, Optical attenuation, and Optical intensity, in connection with various embodiments discussed herein. For the 3C-SVM classifier, the overall classification accuracy and the true positive rate for each class were plotted as performance, as a function of the number of features. For the 3C approaches, mRMR feature selection was used to identify approximately 20-25 features in each subgroup and a total of 841 and 936 features for 3C-RF and 3C-SVM, respectively. For the fibrocalcific DB approaches, using mRMR feature selection, 906 and 906 features were identified for DB-RF and DB-SVM, respectively. Wilcoxon feature selection identified 1051 and 926 features for DB-RF and DB-SVM, respectively. For fibrolipidic DB, mRMR feature selection identified 906 and 941 features for DB-RF and DB-SVM, respectively. Wilcoxon feature selection identified a total of 921 and 1146 features for DB-RF and DB-SVM, respectively. Of course, the numbers of features depended on the stopping rule (discussed in Section 2.3) and training dataset, and can vary between embodiments as a result.

After feature selection, fivefold cross validation and testing were performed on the held-out data. Classifier performance was assessed both with and without the inclusion of the novel morphological and 3D digital edge and texture groups discussed herein. The best 3C approach was the 3C-SVM. For the 3C-SVM approach: using fivefold cross validation on the training data, true positive rates for other, fibrolipidic, and fibrocalcific A-lines to be 80.03±2.86%, 75.78±8.54% and 68.02±8.99%, respectively; on the held-out dataset true positive rates were found for other, fibrolipidic, and fibrocalcific A-lines to be 76.90%, 88.33% and 69.31%, respectively. Referring to FIG. 14, illustrated are confusion matrices showing true positive rates for the 3C-SVM and 3C-RF classifiers on the fivefold cross-validation training data and held out test set, in connection with various embodiments discussed herein. Although both classifiers exhibited similar performance, 3C-SVM had higher true positive rates on both training and held-out data across all groups.

For the DB approaches, it was found that DB-SVM using Wilcoxon feature selection worked best for fibrocalcific classification and that DB-SVM using mRMR feature selection worked best for fibrolipidic classification. For fibrocalcific identification, DB-SVM using Wilcoxon feature selection gave the following results: for fivefold cross-validation of the training data, true positive rates were found for the other and fibrocalcific A-lines to be 87.78±5.51% and 72.09±9.08%, respectively; for the held-out dataset, true positive rates were found for the other and fibrocalcific A-lines to be 90.59% and 73.38%, respectively. For fibrolipidic identification, DB-SVM using mRMR feature selection gave the following results: for fivefold cross-validation of the training data, true positive rates found for the other and fibrolipidic A-lines were 80.59±6.98% and 79.68±8.48%, respectively; for the held-out dataset, true positive rates found for the other and fibrolipidic A-lines were 80.31% and 90.60%, respectively. Confusion matrices containing these results are shown in FIGS. 15-16.

Figure 15:
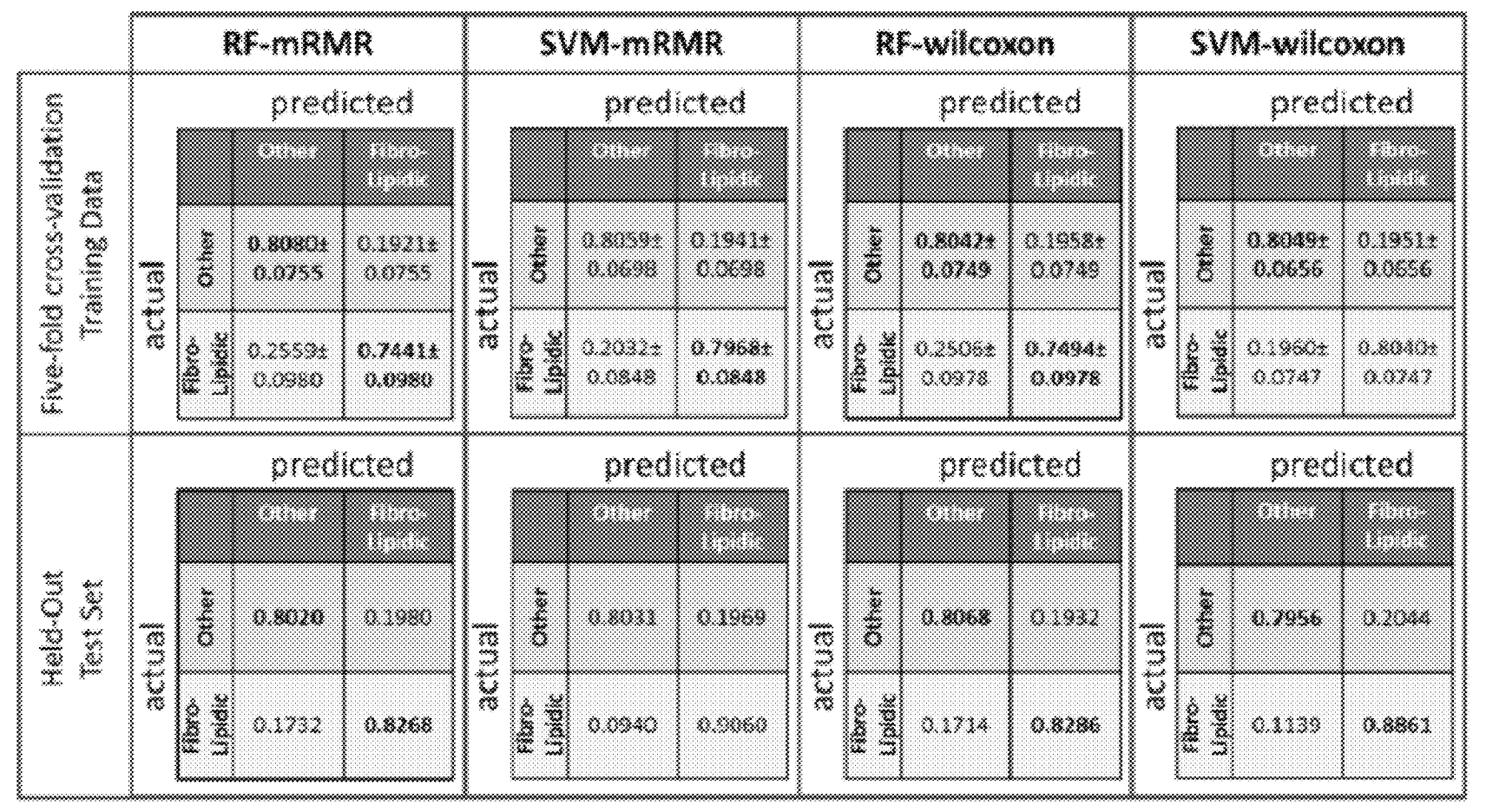

Referring to FIG. 15, illustrated are confusion matrices for binary fibrolipidic classification for the DB approach, in connection with various embodiments discussed herein. Confusion matrices showing true positive rates for training and held-out data are shown for all binary fibrolipid classifiers. All classifiers exhibited similar performance. SVM classifiers had higher true positive rates than RF classifiers for both training and held-out data. In general, SVM-mRMR had similar or higher true positive rates than SVM-Wilcoxon for both training and held-out data, while also using fewer features. Thus, SVM-mRMR was selected as the best fibrolipidic A-line classifier.

Figure 16:
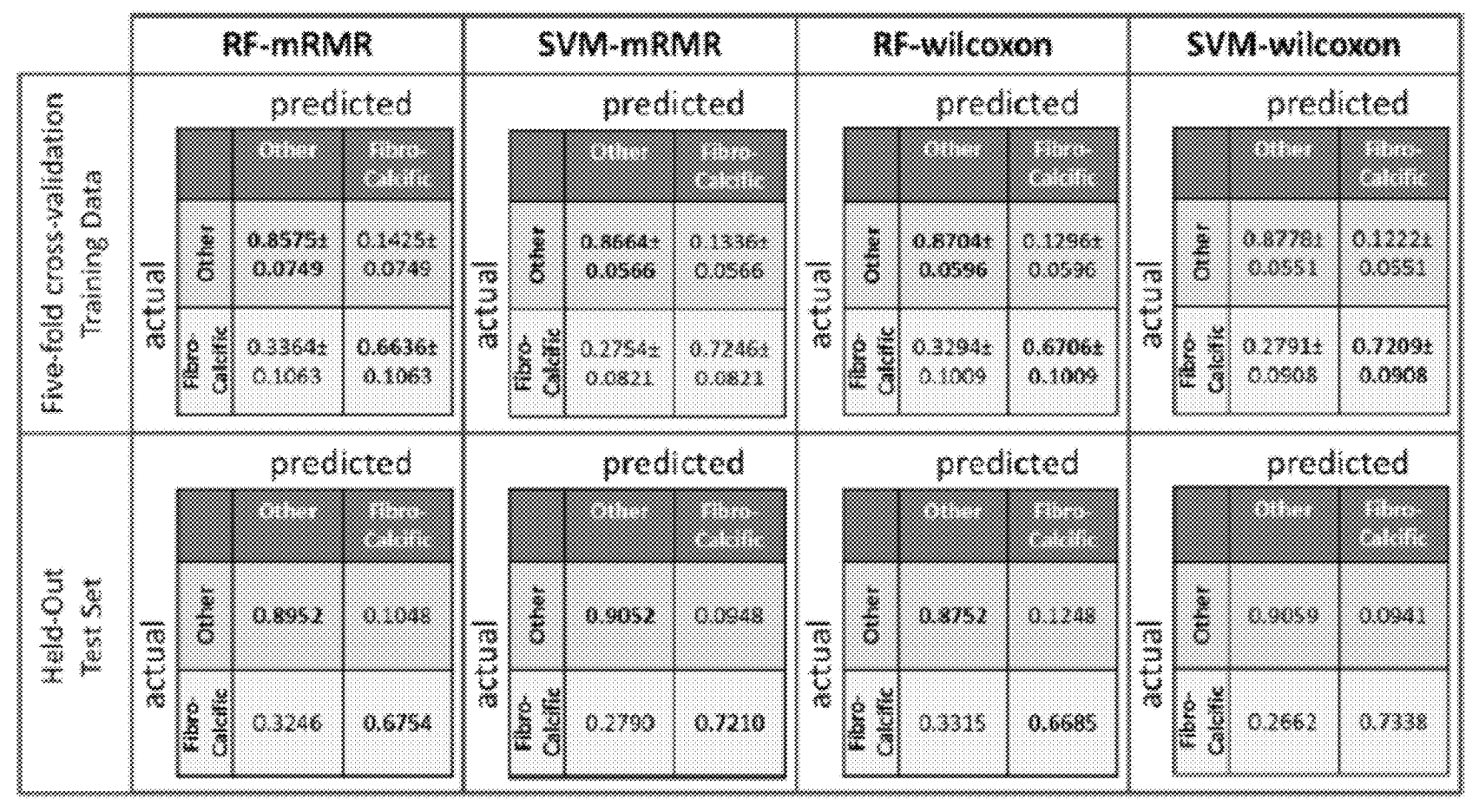

Referring to FIG. 16, illustrated are confusion matrices for binary fibrocalcific classification for the DB approach, in connection with various embodiments discussed herein. Confusion matrices showing true positive rates for training and held-out data are shown for all binary fibrocalcific classifiers. All classifiers exhibited similar performance. As with binary fibrolipidic classifiers, SVM classifiers had higher true positive rates than RF classifiers for the training and held-out data. In general, SVM-Wilcoxon had similar or higher true positive rates than SVM-mRMR for both training and held-out data. Thus, we selected SVM-Wilcoxon as our best fibrocalcific classifier.

Figure 17:
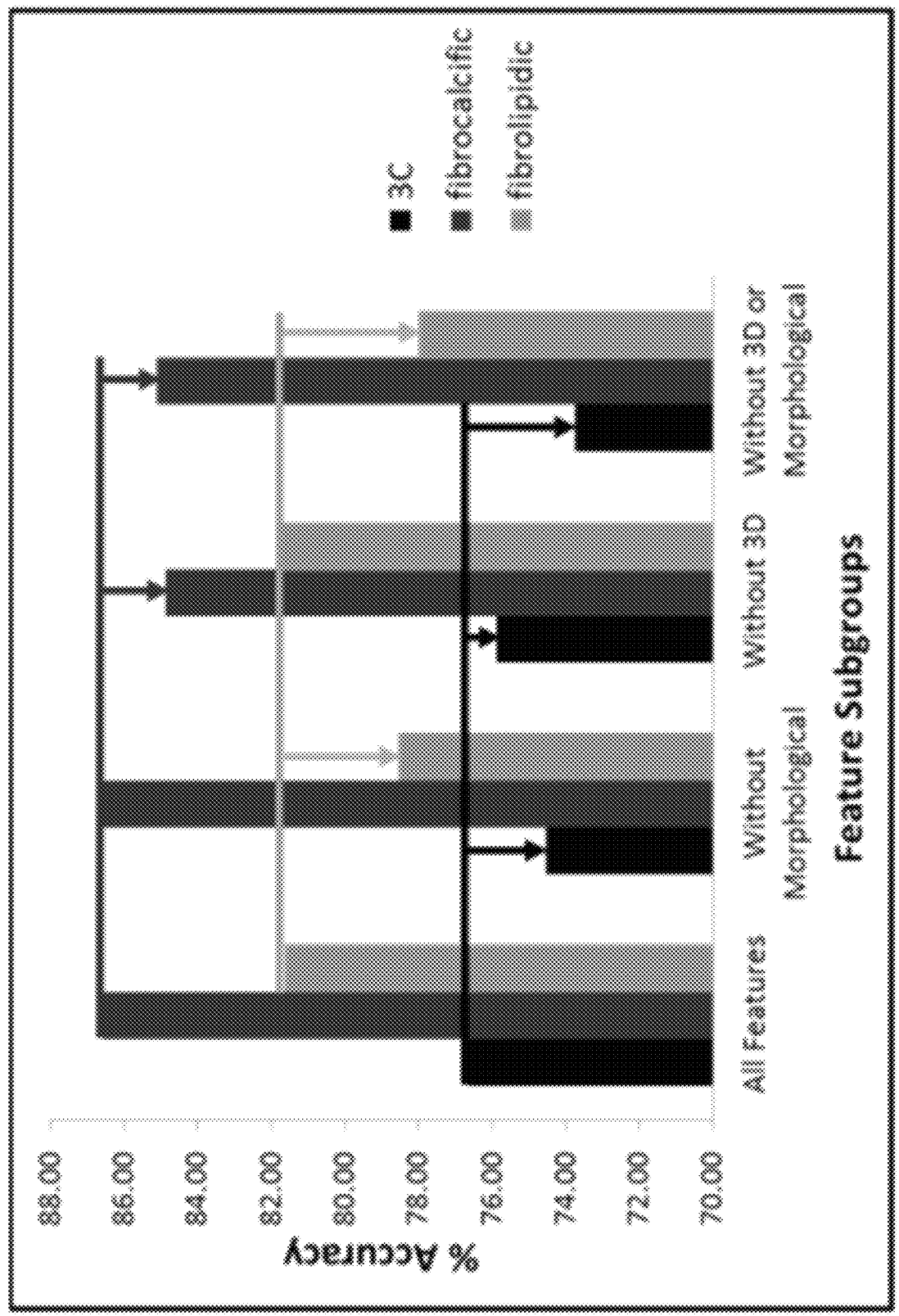
FIG. 17 illustrates a graph showing the added benefit of morphological and 3D feature groups, in connection with various embodiments discussed herein.

Additionally, the utility of including novel morphological and 3D features discussed herein was assessed for A-line plaque assessment. Referring to FIG. 17, illustrated is a graph showing the added benefit of morphological and 3D feature groups, in connection with various embodiments discussed herein. For the best 3C classifier (3C-SVM) and the best binary fibrocalcific (DB-SVM-Wilcoxon) and fibrolipidic (DB-SVM-mRMR) classifiers, the overall classifier accuracy was assessed with and without the use of morphological and 3D features. In virtually all the cases, a decrease in classifier performance was seen when 3D and morphological features were removed, as compared to when they were present. This suggests the value of using morphological and 3D features for plaque assessment. The best 3C, binary fibrocalcific, and fibrolipidic classifiers were used, and the effect of removing the novel 3D and morphological features on overall classification accuracy was observed. For all classifiers, a reduction in overall classification accuracy was found following the removal of both 3D and morphological features, suggesting the utility of incorporating both feature groups for fibrolipidic and fibrocalcific plaque classification.

4.2 Classification Noise Cleaning

Figure 18:
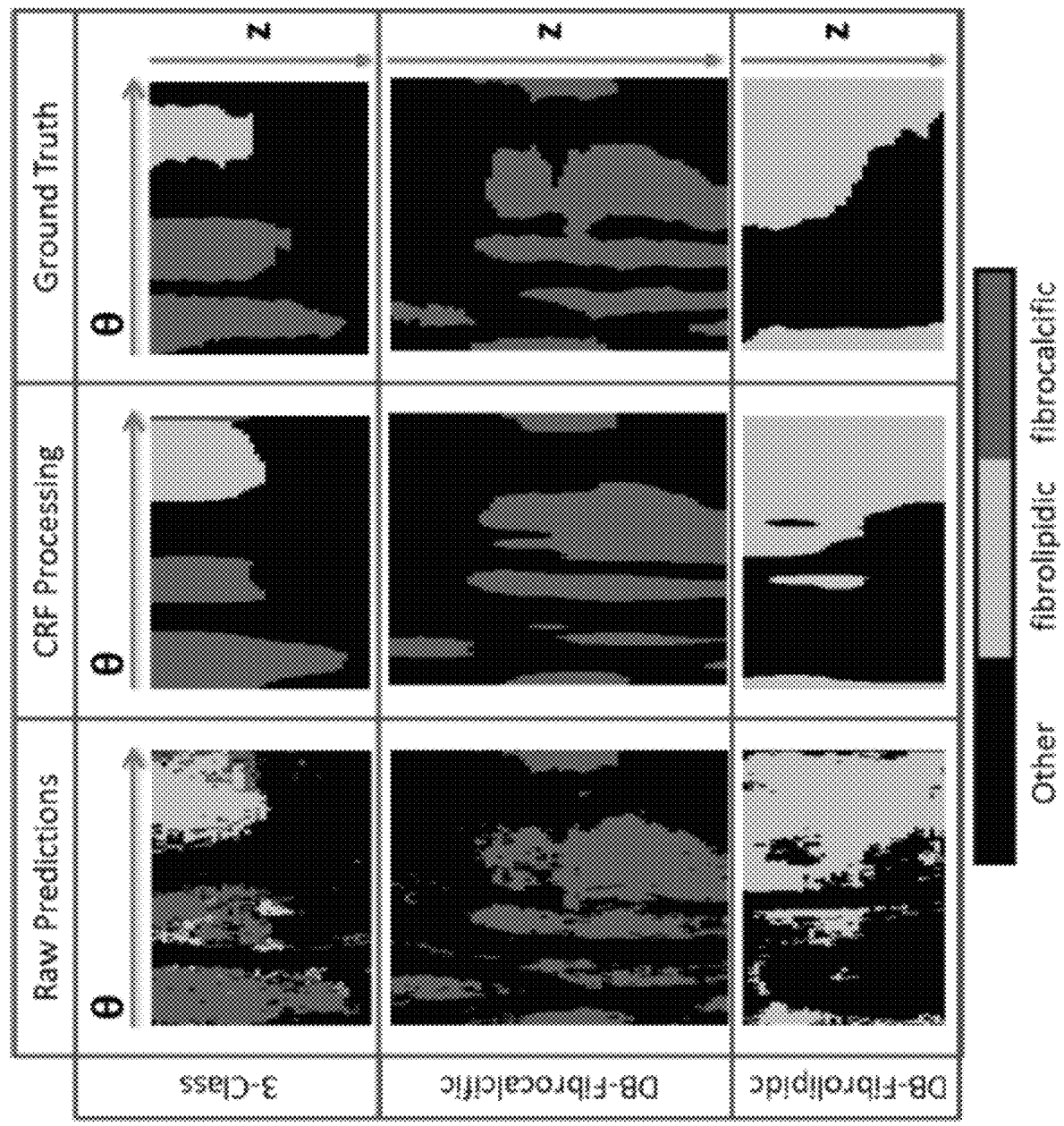
FIG. 18 illustrates example diagrams showing Classification noise cleaning using the en face (θ,z) view, in connection with various aspects discussed herein. CRF implementation smooths the classification results to eliminate isolated A-lines from being classified as plaque.

The example use case integrated the output from the best-performing classifiers from Sections 4.1 and 4.2 into the CRF classification noise cleaning approach described in Section 2.2. Referring to FIG. 18, illustrated are example diagrams showing Classification noise cleaning using the en face ($\theta$,z) view, in connection with various aspects discussed herein. CRF implementation smooths the classification results to eliminate isolated A-lines from being classified as plaque. This is evident for the best 3-Class (3C-SVM), binary fibrocalcific (SVM-Wilcoxon), and binary fibrolipidic (SVM-mRMR) classifiers. FIG. 18 shows a representative case for each classifier: initial classification results (left), CRF cleaned results (middle), and ground-truth annotations by experts (right). It can be visually observed that CRF cleaning made classification results more similar to those of ground-truth labels. For the 3C-SVM model, grid searching suggested the following optimal parameters: $\omega^{(2)}$ as 0.75, $\sigma_\gamma$ in the $\theta$-direction as 1.5, and $\sigma_\gamma$ in the z-direction as 1.5. For the fibrocalcific DB-SVM using Wilcoxon feature selection, the values for $\omega^{(2)}$, $\sigma_\gamma$ in the $\theta$-direction, and $\sigma_\gamma$ in the z-direction were set as 0.5, 1.5, and 1.5, respectively. For the fibrolipidic DB-SVM using mRMR feature selection, the values for $\omega^{(2)}$, $\sigma_\gamma$ in the $\theta$-direction, and $\sigma_\gamma$ in the z-direction were set as 0.5, 1.5, and 1.5, respectively.

For the 3C-SVM approach, CRF cleaning improved the classification true positive rate on the held-out dataset for other, fibrolipidic, and fibrocalcific to 81.44%, 94.48%, and 74.82%, respectively. For the DB classifiers, CRF cleaning improved the fibrolipidic classifier true positive rates for other and fibrolipidic to 84.20% and 94.58%, respectively. The true positive rates for the fibrocalcific classifier in the held-out dataset, however, improved to 95.71% and 76.26% for other and fibrocalcific detection, respectively. For the DB approaches, the cleaned results for the fibrolipidic and fibrocalcific classifiers were merged to compare their performance with that from the 3C classifier. After merging, for the DB approaches, it was found that the true positive rates in the held-out dataset for other, fibrolipidic, and fibrocalcific were 79.90%, 93.63%, and 73.52%, respectively.

Figure 19:
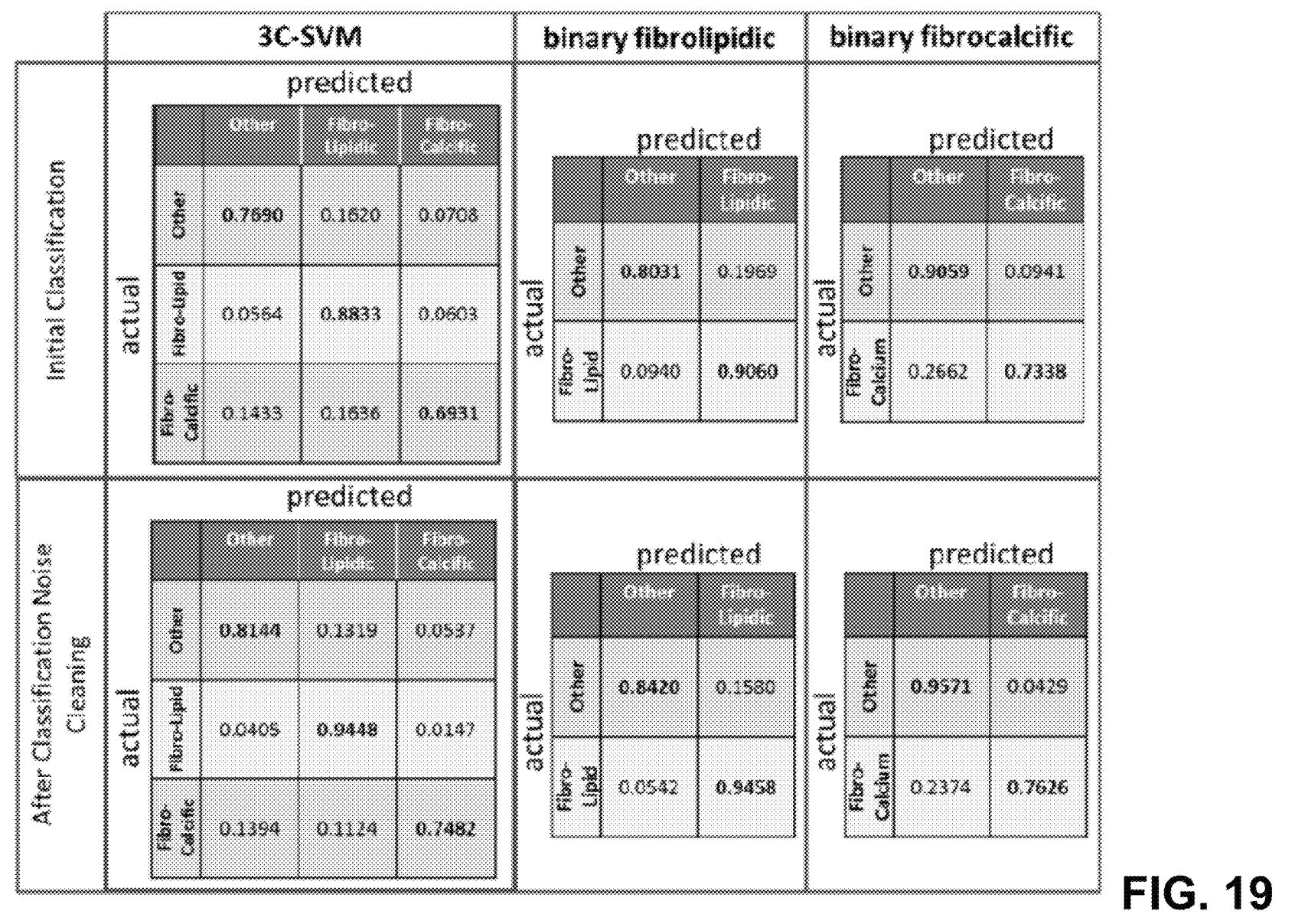

Referring to FIG. 19, illustrated are confusion matrices showing the effect of classification noise cleaning on true positive rates, in connection with various embodiments discussed herein. As can be seen in FIG. 19, Classification noise cleaning improves the classification true positive rates. CRF cleaning was applied to the best 3-class (3C-SVM), binary fibrolipidic (DB-SVM-mRMR), and binary fibrocalcific (DB-SVM-Wilcoxon) classifiers. In all the cases, a boost in true positive rates was observed for other, fibrolipidic, and fibrocalcific classification.

Referring to FIG. 20, illustrated are confusion matrices showing a comparison after classification noise cleaning between the 3C and DB classification approaches, in connection with various embodiments discussed herein. FIG. 20 shows a comparison of the 3C and combined binary fibrolipidic and fibrocalcific classifiers for multiclass classification on the held-out test set. After classification noise cleaning, the results of the dual binary classifiers were merged to enable direct comparison with the 3C approach for multiclass classification. As can be seen in FIG. 20, very similar values were obtained between the two multiclass approaches, with slightly better performance from the approach using one classifier to identify all three classes.

4.3 Successful and Challenging Classification Cases

Figure 21:
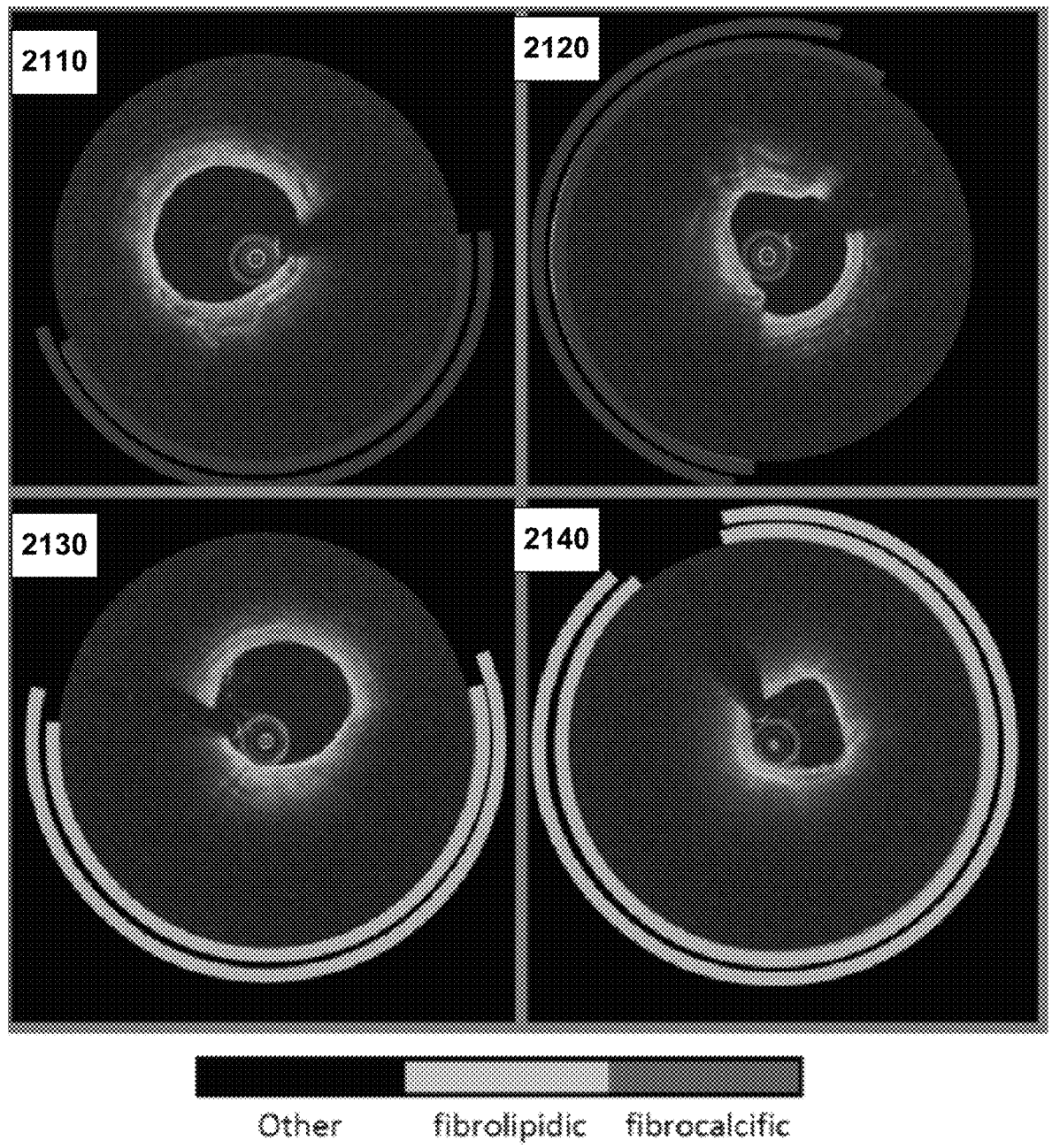
FIG. 21 illustrates example images showing successful classification results of the 3C-SVM classifier on the held-out test set, in connection with various embodiments discussed herein.

Overall, the DB classification approach worked very well in the majority of cases. Referring to FIG. 21, illustrated are example images showing successful classification results of the 3C-SVM classifier on the held-out test set, in connection with various embodiments discussed herein. Images 2110-2140 show agreement between expert annotated (outer ring) and automated assessment (inner ring) of plaque angular boundaries. Images 2110 and 2120 show two frames successfully classified as fibrocalcific, with the near-perfect agreement of boundaries between manual and automated assessment. Images 2130 and 2140 show two representative frames successfully classified as fibrolipidic. Again, there is a near-perfect agreement of boundaries between manual and automated assessment. Fibrocalcific cases with sharp borders, a textured appearance, and very eccentric lumens were easily classified. Image 2110 shows an ~150° fibrocalcific lesion with a textured appearance and visually sharp luminal and abluminal boundaries. Image 2120 shows a >180° fibrocalcific lesion with a very eccentric lumen, textured appearance, but only luminal boundaries that were visibly sharp. In both cases, however, the classifier gave near-perfect assessments of the lesion angular boundaries. Fibrolipidic cases in which the signal initially peaks and then decreases were also correctly classified. Image 2130 shows an ~270° fibrolipidic lesion with a sharp peak near the luminal boundary followed by a rapid decay of the signal. Image 2140 shows a near −360° fibrolipidic lesion with a characteristic initial peak followed by a precipitous decay of the signal. In both fibrolipidic lesions, a near-perfect agreement of plaque angular boundaries between manual and automated assessment was observed.

Figure 22:
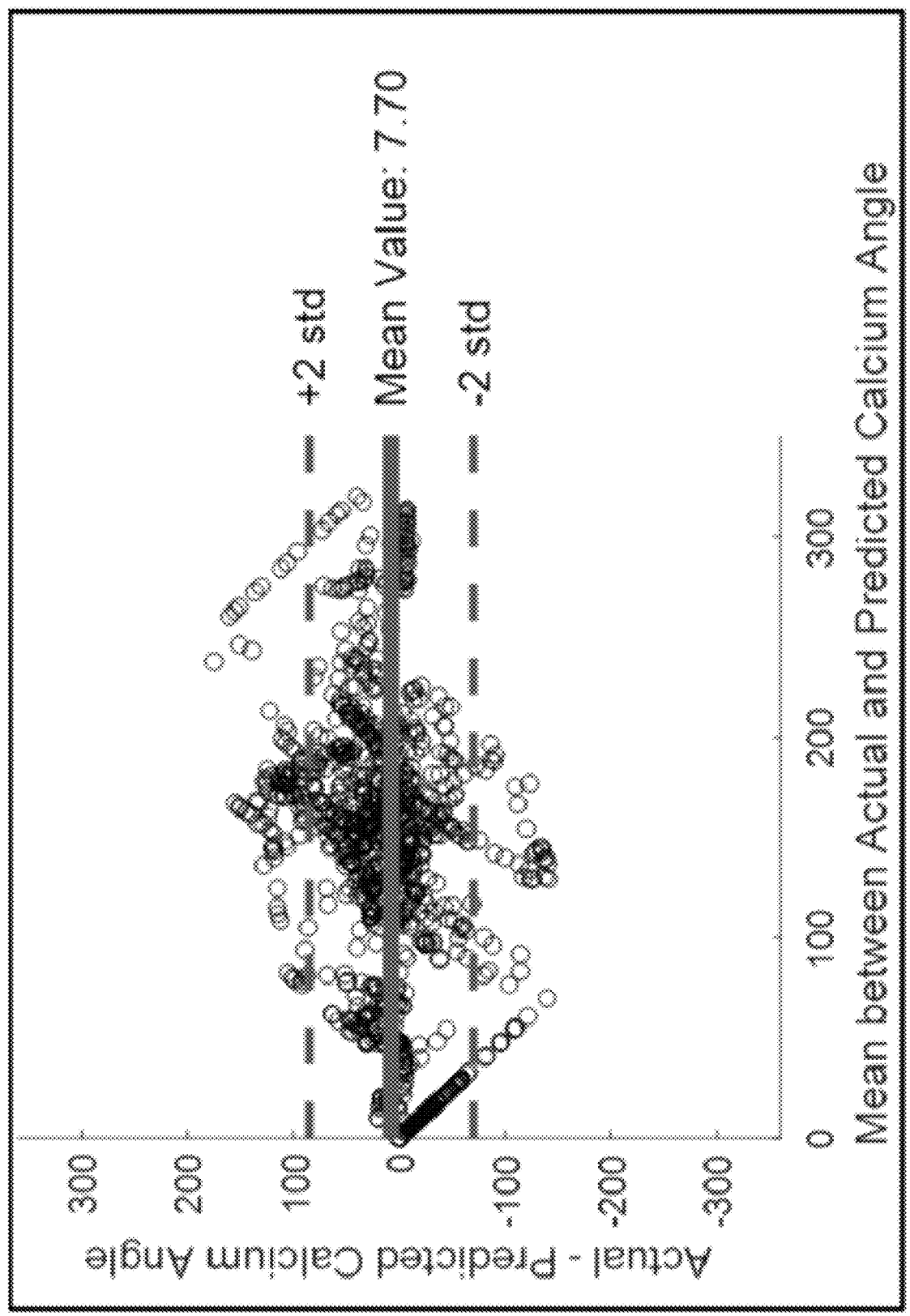
FIG. 22 illustrates a graph showing a Bland-Altman assessment of manual and automated assessment of fibro-calcific angle in connection with various embodiments discussed herein.

Because fibrocalcific angle assessment is critical for clinical treatment planning, agreement was assessed across all frames in the held-out test set between manual and automated analysis. Bland-Altman analysis of the fibrocalcific angle demonstrated a very strong correlation between the expert and automated assessments. On average, the difference between automated and manual assessment was only 7.7°±39.0°. Only 141 of the 1737 images assessed in the held-out test set were outside the 95% confidence interval. No apparent bias was observed regarding plaque angle, which suggested that embodiments can accurately predict the angle of both small and large calcified lesions. Referring to FIG. 22, illustrated is a graph showing a Bland-Altman assessment of manual and automated assessment of fibrocalcific angle in connection with various embodiments discussed herein. The Bland-Altman assessment demonstrates a strong agreement between the manual and automated assessment of fibrocalcific plaque boundaries across all frames in the held-out test set. The mean value of agreement was 7.70±38.97°. No apparent bias was observed regarding plaque angle, which suggested that embodiments can accurately predict the angle of both small and large calcified lesions. Only 141 of 1737 frames were outside the 95% confidence interval of agreement.

Figure 23:
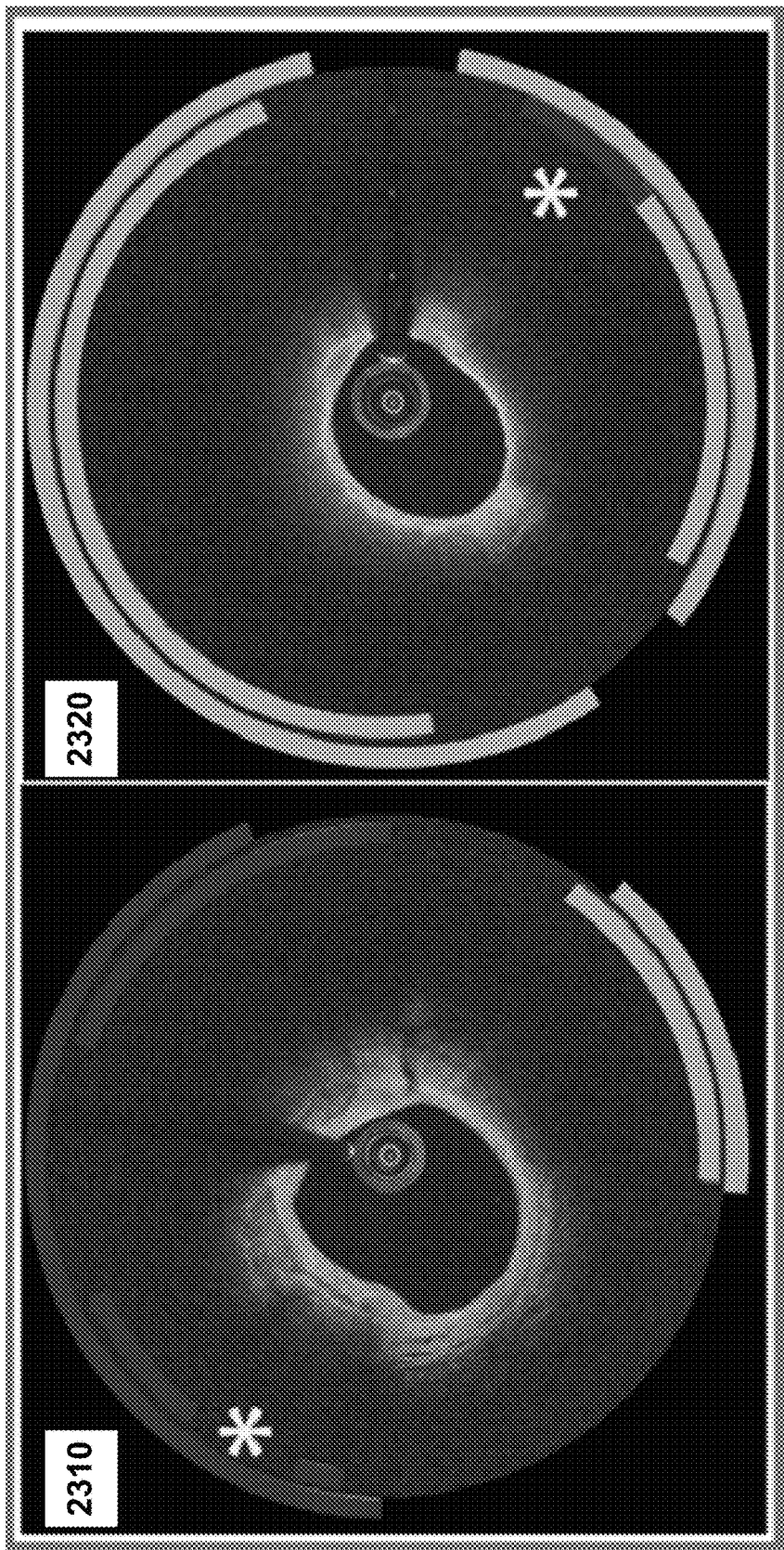
FIG. 23 illustrates example images of challenging cases for classification in connection with the example use case.

Across all the 1737 images in the held-out test set, the example use case confronted only a few challenging cases. However, such cases would likely be difficult for an analyst as well. Referring to FIG. 23, illustrated are example images of challenging cases for classification in connection with the example use case. Images 2310 and 2320 show agreement between expert annotated (outer ring) and automated assessment (inner ring) of A-line classification. Image 2310 shows an image that contains both fibrocalcific and fibrolipidic A-lines. The classifier correctly identifies both lesions. However, one part of the lesion referred to as fibrocalcific by the analysts is designated as "other" by the classifier. This is because a clear back border is not visible in this region, and it is possible that this region of the plaque is mixed. Image 2320 shows a lesion that was judged to be fibrolipidic by the analysts. However, the classifier designates one portion of the lesion as fibrocalcific because this region does not decay clearly, and the fibrocalcific portion does appear to have some textured appearance and a slightly eccentric shape following the initial signal peak. In both cases, it is possible that this case was either misclassified by our experts or contained some combination of both lipidic and calcific plaque.

4.4 Transition of Classification Output to Segmentation Methods

Figure 24:
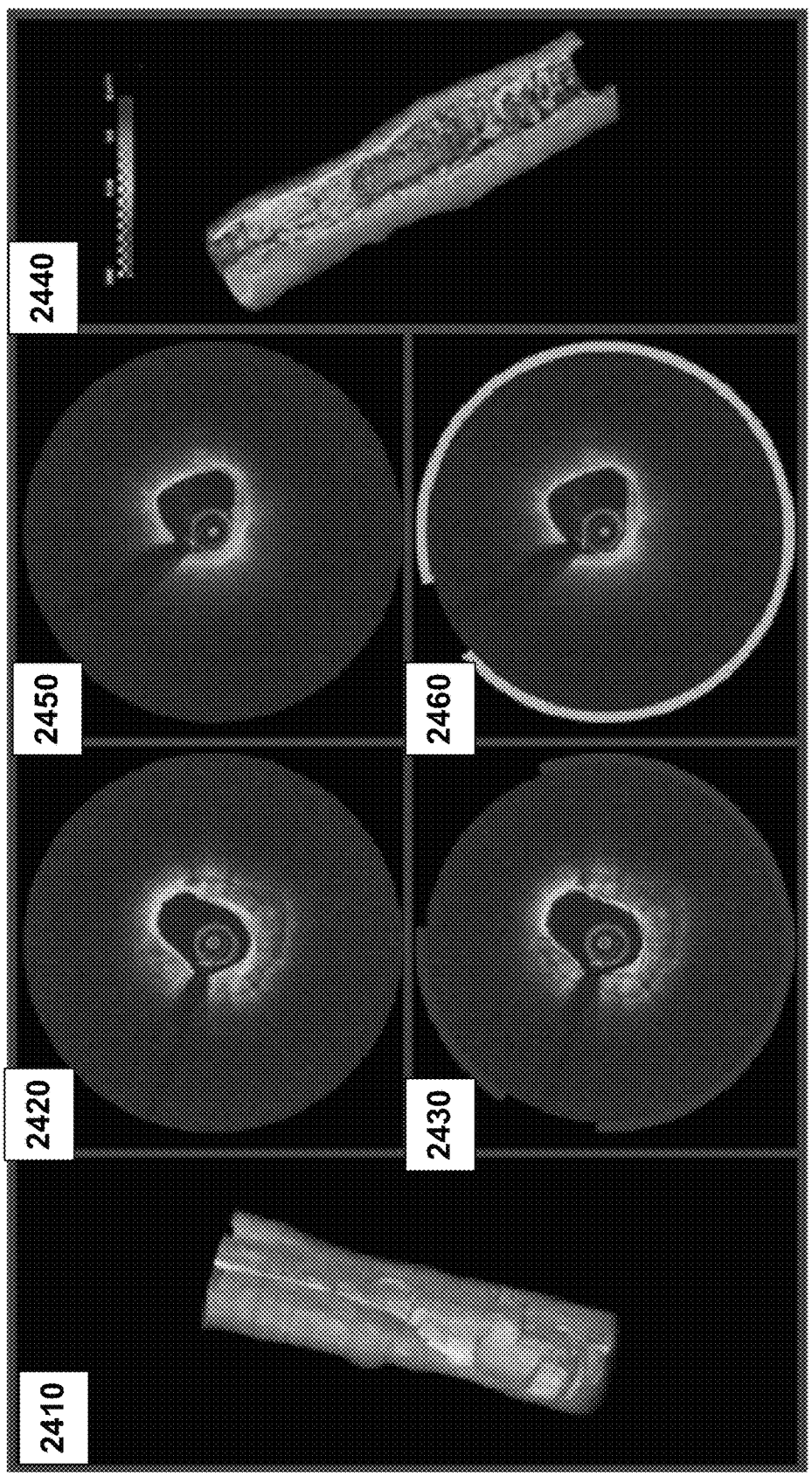
FIG. 24 illustrates example images showing how A-line classification results can be transitioned into semi-automated or fully automated plaque segmentation, in connection with various embodiments discussed herein.

The example use case assessed the feasibility of streamlining the A-line classification results into semiautomated segmentation methods for one representative fibrolipidic case and one representative fibrocalcific case from the held-out test set. Referring to FIG. 24, illustrated are example images showing how A-line classification results can be transitioned into semi-automated or fully automated plaque segmentation, in connection with various embodiments discussed herein. The example use case demonstrated proof-of-concept to output A-line classification results into fibrocalcific and fibrolipidic boundary segmentation approaches, which can enable fully automated plaque classification and segmentation. Images 2410-2430 show a representative fibrocalcific plaque example, and images 2440-2460 show a representative fibrolipidic plaque example. In both examples, the first image (2410 or 2440) contains a volume rendering with vessel wall shown, and the second (2420 or 2450) and third (2430 or 2460) show a representative frame before and after plaque boundary segmentation, respectively. In image 2410, calcium plaque is shown in white. Image 2440 shows lipid cap thickness in heatmap. The example use case employed the cleaned results from the 3C-SVM classifier. The semiautomated calcium segmentation method was able to outline the fibrocalcific plaque boundary in individual frames (images 2410-2430). Fibrolipidic border segmentation was also possible (images 240-2460). The results demonstrated the feasibility of combining classification output with segmentation methods for fully automated plaque classification and segmentation.

5. Discussion

The example use case employed hand-crafted features and expansive clinical in vivo and novel ex vivo validation datasets (totaling ~7000 images) to develop automated methods to identify fibrolipidic and fibrocalcific IVOCT A-lines. Compared with semantic, pixel-based classification methods, A-line plaque classification is advantageous. IVOCT data are acquired as a series of 1D A-lines, which makes A-line analysis a natural means of assessing IVOCT images. Pixel-based classification is severely compromised in areas containing highly attenuating tissue types, such as lipid plaque, because the IVOCT signal can drop off precipitously after entering the vascular tissue, as discussed in connection with FIG. 3. Pixel-based classification can produce granular borders, which do not reflect the plaque boundaries that are histologically observed. The output from A-line plaque classification is better suited to handshake with existing fibrolipidic and fibrocalcific boundary segmentation techniques, a combination which enables fully automated plaque classification and quantification. Therefore, the example use case extracted hand-crafted features to facilitate A-line plaque classification. The example use case incorporated a variety of features that assessed tissue optical properties, A-line peaks, and 2D texture features, as well as novel features based on vascular lumen morphology, and 2D/3D digital edge and texture. These extracted features were used to develop various automated A-line plaque classification approaches. Two broad strategies were investigated for multiclass classification: a 3C approach and DB classifiers. The 3C approaches tried to simultaneously detect fibrolipidic and fibrocalcific A-lines, and the DB approaches tried to detect fibrolipidic and fibrocalcific A-lines independently. At least on the datasets in the example use case, the 3C approach using a multiclass SVM classifier and mRMR feature selection had the best performance. Following classification noise cleaning (discussed in connection with FIG. 17), this approach had true positive rates for all A-lines in a held-out test set (~1800 images) of 81.44, 94.48, and 74.82 for other, fibrolipidic, and fibrocalcific A-lines, respectively. Additionally, the example use case demonstrated proof-of-concept for streamlining classification output with fibrolipidic and fibrocalcific boundary segmentation methods (discussed in connection with FIG. 21). Various embodiments can perform fully automated fibrolipidic and fibrocalcific boundary segmentation. Additionally, the example use case demonstrated that these techniques can be employed for fully automated IVOCT plaque characterization, which can facilitate real-time treatment planning and offline assessment of drug and biological therapeutics.

The example use case varied multiclass classification strategy, choice of classifier, and feature selection algorithms to optimize classification performance. The decision to vary such parameters was based on results that suggested that optimizing these parameters affects classification performance. The best 3C classification approach implemented an SVM classifier and mRMR feature selection. The best binary fibrocalcific classifier used an SVM classifier and Wilcoxon feature selection. The best fibrolipidic binary classifier, however, used an SVM classifier with mRMR feature selection. The best binary classifiers were merged to obtain a multiclass result, which was compared with the results of 3C classification. After merging the DB results, cases were found in which the fibrolipidic and fibrocalcific results overlapped. In such cases, the A-line was classified on the basis of which class had the highest classification probability following initial classification. Alternatively, in various embodiments, a separate binary classifier can be employed to distinguish between fibrolipidic and fibrocalcific to better separate such cases. However, it is possible that certain A-lines contain both lipidous and calcified plaques, an occurrence which was observed within the ex vivo validated dataset. Accordingly, various embodiments can incorporate an additional class into the classification approach (fibrocalcific-lipidic). Overall, however, the fact that all approaches performed similarly is evidence of the robustness of the feature set.

Incorporation of novel morphological and 3D features into the classification approach improved the overall classification accuracy (as discussed in connection with FIG. 15). Morphological features were employed based on an understanding that vascular lumen morphology changes coincides with plaque incidence. Digital 2D/3D edge features accounted for the difference in edge strength observed between the fibrolipidic and fibrocalcific boundaries. 3D features accounted for the biologically observed, volumetric continuity of blood vessels and associated plaques. The improvement in overall classification accuracy by incorporating these feature groups suggests that embodiments can benefit by considering such features for IVOCT plaque classification. Additionally, in various embodiments, deep learning approaches can be employed in connection with IVOCT image analysis and plaque classification. Hybrid methods, which combine such deep learning results with the hand-crafted features used in the example use case, could further improve classification performance in various embodiments.

Classification noise cleaning, which combines CRF and morphological image-processing operations, smoothed classification results and improved classification true positive rates. This processing was performed on the en face (θ-z) view of data, which allows for viewing volumetric classification results for a vessel in a single 2D view. Thus, various embodiments can ensure that classification results make sense from a biological standpoint concerning continuous volumetric plaque morphology. The example use case employed a CRF model for classification noise cleaning. This algorithm considers the classification probabilities, but also enables incorporation of intensity information into determining cleaned classification results. However, the example use case only considered classification probabilities. Various other embodiments can incorporate en face intensity data, which can potentially improve classification performance. In work associated with the techniques discussed herein, intensity-based IVOCT en face views were generated to facilitate stent segmentation, and such views could be incorporated into the CRF model.

The example use case demonstrated the feasibility of streamlining A-line classification results to handshake with fibrolipidic and fibrocalcific boundary segmentation techniques. The combination of these two approaches enables fully automated plaque classification and segmentation (as discussed in connection with FIG. 19). Thus, in contrast to existing techniques, embodiments discussed herein can combine machine learning approaches with segmentation models for fully automated IVOCT image analysis. The example use case assessed the feasibility of combining classification results with segmentation methods for representative fibrolipidic and fibrocalcific cases. Various embodiments can potentially provide more accurate classification via assessment of the computational measurements between fully automated results and expert analysts. Fully automated IVOCT plaque characterization, such as via various embodiments discussed herein, can facilitate live-time patient diagnosis and stent treatment planning. In some embodiments, automated results can be input into finite element models to predict the clinical outcomes of using stents in certain lesions. Thus, from the image, embodiments can predict clinical outcome and facilitate decision making for stent vs. no-stent and assess the need for lesion atherectomy. Moreover, using fibrolipidic segmentation analysis, if a large segment of lipid plaque with a thin fibrous cap is confronted, various embodiments can generate recommendations on proper stent sizing, and/or assess the need for proper drug-eluting stents. Classification models were developed using both in vivo and ex vivo training data. This is advantageous because it instills confidence in the training data and annotation labels. Classification model training using ex vivo training data alone was not assessed because of the lack of ex vivo cases, but this transfer learning approach can be employed in embodiments using an expanded ex vivo database. Although the classification approach of the example use case performed well in the majority of cases, there were several challenging cases in the held-out test set (e.g., as discussed in connection with FIG. 21). Embodiments employing an expanded ex vivo validated training database could help with classifying such cases or could further show that certain cases are difficult to classify. Thus, 3D cryo-imaging could aid in determining the exclusion criteria for assessing which cases should not be considered for classification analysis.

A number of software implementation optimizations were employed in the classification approaches of the example use case. The example use case involved machine learning using very expansive datasets. In total, ~2.3 million A-lines were analyzed, each as an individual sample. For each A-line, a total of ~5000 features were extracted before feature selection, most of which were of data type double. Thus, although the computer used for the example use case had 128 GB of memory, frequent memory clearing was employed when performing computations on the entire data. For feature extraction, preallocation of data matrices was employed, and computation were performed on partitions of data at a time. Matrix reshaping and concatenation to generate the ConcatenatedRe image and 3D (r,θ,z) matrix facilitated the computational extraction of digital edge and texture features. When performing classification model development and fivefold cross-validation training, data was subsampled. These computational limitations could be circumvented in various embodiments by using computers with greater memory and/or more powerful graphics processing unit(s), or with selective sampling of the data to reduce the number of similar cases that were considered in the training set. Finally, although the classification time on precomputed features for the 3C-SVM classifier was ~3 seconds per frame, classification feature extraction is a rate-limiting step. Feature extraction could be expedited via further feature reduction, which may generate comparable classification results, or classification results with an acceptable decrease in true positive rates. However, these concerns, while relevant to classifier training (which need not be performed in real time), do not affect employing trained classifier(s) of various embodiments to classify imaging data of a single patient, as this involves a substantially smaller dataset and fewer features.

6. Conclusion

Automated plaque classification can facilitate IVOCT image analysis. The example use case employed hand-crafted features and expansive in vivo and novel ex vivo 3D cryo-image validated datasets to develop machine learning approaches to identify fibrocalcific and fibrolipidic A-lines in IVOCT images. The experimental results suggested using novel 3D and morphological features, a three-class multi-class classifier, mRMR feature selection, and classification noise cleaning using CRFs for optimal performance. Classification performance on a held-out test set demonstrated high true positive rates with the approach. Proof-of-concept for streamlining the output of classification to handshake with plaque segmentation methods was demonstrated. Various embodiments can be employed to facilitate fully automated IVOCT plaque characterization for both live-time treatment planning and offline assessment of drug and biologic therapeutics.

Additional Embodiments

In various example embodiments, method(s) discussed herein can be implemented as computer executable instructions. Thus, in various embodiments, a computer-readable storage device can store computer executable instructions that, when executed by a machine (e.g., computer, processor), cause the machine to perform methods or operations described or claimed herein including operation(s) described in connection with methods 100, 200, or any other methods or operations described herein. While executable instructions associated with the listed methods are described as being stored on a computer-readable storage device, it is to be appreciated that executable instructions associated with other example methods or operations described or claimed herein can also be stored on a computer-readable storage device. In different embodiments, the example methods or operations described herein can be triggered in different ways. In one embodiment, a method or operation can be triggered manually by a user. In another example, a method or operation can be triggered automatically.

Embodiments discussed herein relate to training and/or employing classifier(s) that facilitate classification of vascular plaque(s) based on features in medical imaging data that are not perceivable by the human eye, and involve a computation that cannot be practically performed in the human mind. As one example, machine learning and/or deep learning classifiers as described herein cannot be implemented in the human mind or with pencil and paper. Embodiments thus perform actions, steps, processes, or other actions that are not practically performed in the human mind, at least because they require a processor or circuitry to access digitized images stored in a computer memory and to extract or compute features that are based on the digitized images and not on properties of tissue or the images that are perceivable by the human eye. Embodiments described herein can use a combined order of specific rules, elements, operations, or components that render information into a specific format that can then used and applied to create desired results more accurately, more consistently, and with greater reliability than existing approaches, thereby producing the technical effect of improving the performance of the machine, computer, or system with which embodiments are implemented.

Figure 25:
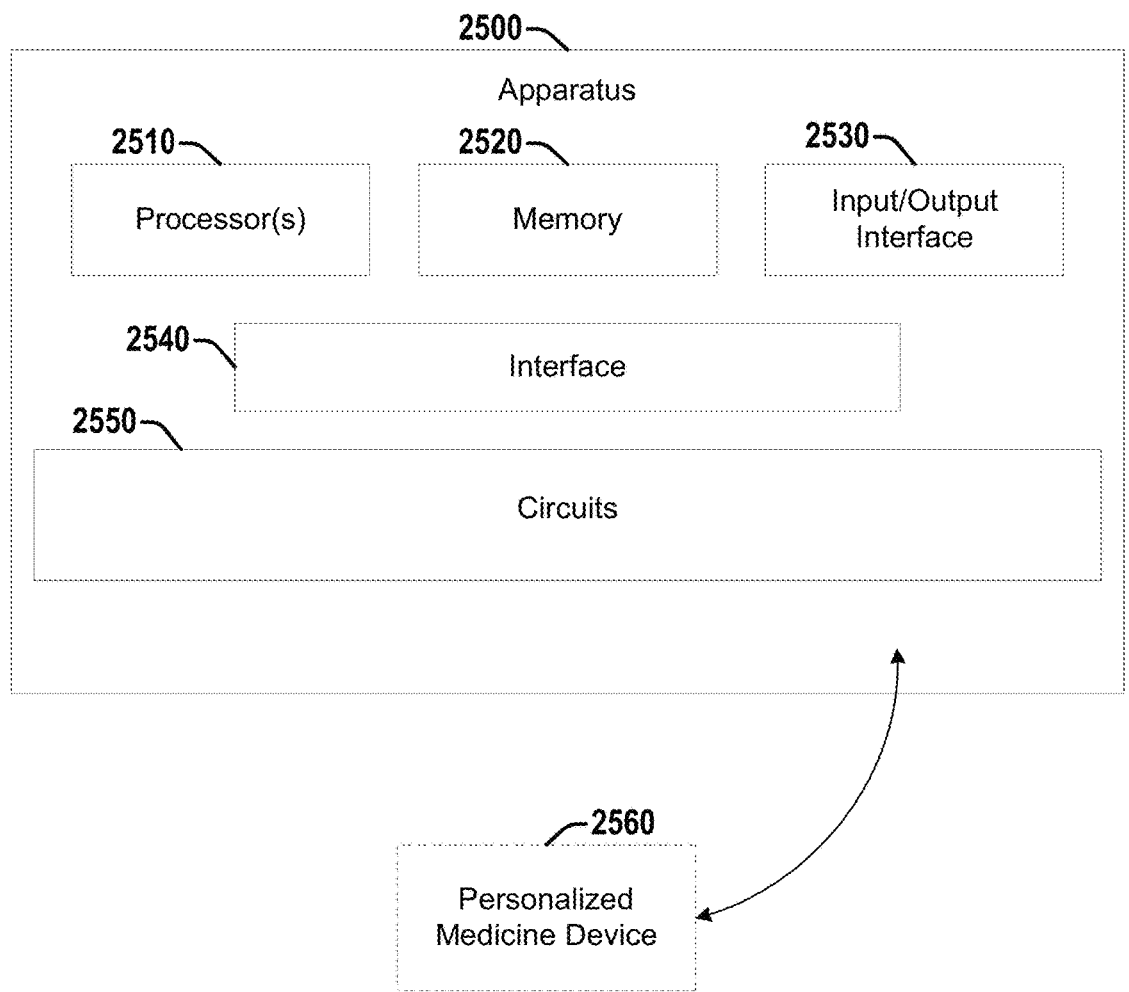
FIG. 25 illustrates a diagram of a first example apparatus 2500 that can facilitate one or more of training at least one classifier to classify vascular plaque(s) or employ at least one trained classifier to classify vascular plaque(s), according to various embodiments discussed herein.

Referring to FIG. 25, illustrated is a diagram of a first example apparatus 2500 that can facilitate one or more of training at least one classifier to classify vascular plaque(s) or employ at least one trained classifier to classify vascular plaque(s), according to various embodiments discussed herein. Apparatus 2500 can be configured to perform various techniques discussed herein, for example, various operations discussed in connection with sets of operations 100 and/or 200. Apparatus 2500 comprises one or more processors 2510. Apparatus 2500 also comprises a memory 2520. Processor(s) 2510 can, in various embodiments, comprise circuitry such as, but not limited to, one or more single-core or multi-core processors. Processor(s) 2510 can include any combination of general-purpose processors and dedicated processors (e.g., graphics processors, application processors, etc.). The processor(s) can be coupled with and/or can comprise memory (e.g., of memory 2520) or storage and can be configured to execute instructions stored in the memory 2520 or storage to enable various apparatus, applications, or operating systems to perform operations and/or methods discussed herein. Memory 2520 can be configured to store imaging (e.g., IVOCT, IVUS, IVOCT/IVUS, IVOCT/NIR Fluorescence, etc.) of intravascular plaques, for example, IVOCT imaging of coronary artery plaque(s). IVOCT (or IVUS, etc.) imaging can comprise a plurality of A-lines sampled in a helical manner, with each full rotation of the IVOCT (etc.) imaging probe referred to herein as a slice or frame. Each A-line can comprise an intensity curve indicating associated intensity values for points along the path of that A-line, and can also be represented as a plurality of pixels or voxels (e.g., in a line in an x-y or r-θ plane of a slice), each pixel or voxel having an associated intensity. Memory 2520 can be further configured to store additional data involved in performing operations discussed herein, such as for classification (e.g., fibro-calcific, fibro-lipidic, other) of vascular plaques and/or training at least one classifier to classify vascular plaques, as discussed in greater detail herein.

Apparatus 2500 also comprises an input/output (I/O) interface 2530 (e.g., associated with one or more I/O devices), a set of circuits 2550, and an interface 2540 that connects the processor 2510, the memory 2520, the I/O interface 2530, and the set of circuits 2550. I/O interface 2530 can be configured to transfer data between memory 2520, processor 2510, circuits 2550, and external devices, for example, a medical imaging device (e.g., IVOCT and/or IVUS system or apparatus, etc.), and/or one or more remote devices for receiving inputs and/or providing outputs to a clinician, patient, etc., such as optional personalized medicine device 2560.

The processor(s) 2510 and/or one or more circuits of the set of circuits 2550 can be configured to receive IVOCT (etc.) imaging (e.g., from memory 2520 or from an external device, etc.). The IVOCT (etc.) imaging can comprise imaging of vascular plaque(s), such as IVOCT imaging of coronary artery plaque(s).

The processor(s) 2510 and/or one or more circuits of the set of circuits 2550 can perform one or more acts associated with a method or set of operations discussed herein, such as set(s) of operations 100 and/or 200.

Apparatus 2500 can optionally further comprise personalized medicine device 2560. Apparatus 2500 can be configured to provide the predicted risk of adverse event(s) and/or risk stratification report, or other data to personalized medicine device 2560. Personalized medicine device 2560 may be, for example, a computer assisted diagnosis (CADx) system or other type of personalized medicine device that can be used to facilitate monitoring and/or treatment of an associated medical condition. In some embodiments, processor(s) 2510 and/or one or more circuits of the set of circuits 2550 can be further configured to control personalized medicine device 2560 to display vascular plaque classification(s), predicted risk(s) of adverse event(s), recommendations related to various drugs and/or biological treatments such as stents or lesion atherectomy, or other data on a computer monitor, a smartphone display, a tablet display, or other displays.

Examples herein can include subject matter such as an apparatus, an IVOCT system, an IVUS system, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for generating system-independent quantitative perfusion measurements, according to embodiments and examples described.

Example 1 is a non-transitory computer-readable medium storing computer-executable instructions that, when executed, cause a processor to perform operations, comprising: accessing vascular imaging data comprising one or more slices, wherein each slice comprises a plurality of A-lines of that slice; for each A-line of the plurality of A-lines of each slice of the one or more slices: extracting one or more features for that A-line, wherein the one or more features for that A-line comprise at least one of: one or more features extracted from that A-line, one or more features extracted from the slice comprising that A-line, or one or more features extracted from the vascular imaging data; providing the one or more features for that A-line to at least one classifier; and generating a classification of that A-line via the at least one classifier, wherein the classification of that A-line is one of fibrocalcific, fibrolipidic, or other.

Example 2 comprises the subject matter of any variation of any of example(s) 1, wherein the operations further comprise performing pre-processing on the vascular imaging data.

Example 3 comprises the subject matter of any variation of any of example(s) 2, wherein performing pre-processing on the vascular imaging data comprises one or more of: performing speckle reduction on the vascular imaging data, performing imaging correction on the vascular imaging data, or segmenting a lumen in the vascular imaging data.

Example 4 comprises the subject matter of any variation of any of example(s) 1-3, wherein the operations further comprise cleaning classification results of the at least one classifier based on a fully connected conditional random field (CRF).

Example 5 comprises the subject matter of any variation of any of example(s) 1-4, wherein, for each A-line of the plurality of A-lines of that slice, the one or more features for that A-line comprise one or more lumen morphological features for that A-line, wherein the one or more lumen morphological features for that A-line comprise one or more of: a change in lumen area of that slice compared to one or more adjacent slices, a Frame Lumen Eccentricity (FLE) of that slice, a change in FLE across z of that slice compared to the one or more adjacent slices, an A-line Lumen Eccentricity (ALE) of that A-line, a mean of the ALE in an A-line neighborhood surrounding that A-line, a standard deviation of the ALE in the A-line neighborhood surrounding that A-line, a change in the ALE of that A-line compared to the one or more adjacent slices, a change in the mean of the ALE of that A-line compared to the one or more adjacent slices, a change in the standard deviation ALE of that A-line compared to the one or more adjacent slices, an anatomical view local curvature of that A-line, or an R-θ lumen curvature of that A-line.

Example 6 comprises the subject matter of any variation of any of example(s) 1-5, wherein, for each A-line of the one or more A-lines, the one or more features for that A-line comprise one or more imaging features for that A-line, wherein the one or more imaging features for that A-line comprise one or more of: an image intensity of that A-line, an imaging attenuation of that A-line, a distance between a catheter and a lumen boundary of that A-line, or a distance to a background intensity of that A-line.

Example 7 comprises the subject matter of any variation of any of example(s) 1-6, wherein, for each A-line of the one or more A-lines, the one or more features for that A-line comprise one or more A-line peak features for that A-line, wherein the one or more A-line peak features for that A-line comprise one or more of: a number of prominent peaks of that A-line; Euclidean distances between a first n peaks of that A-line, wherein n is a positive integer; widths of the first n peaks of that A-line; prominences of the first n peaks of that A-line; locations of the first n peaks of that A-line; a polynomial curve fitting of that A-line; a location where a signal falls below a threshold intensity for that A-line; or an area under a curve of that A-line.

Example 8 comprises the subject matter of any variation of any of example(s) 1-7, wherein, for each A-line of the one or more A-lines, the one or more features for that A-line comprise one or more two-dimensional (2D) digital edge and/or texture features for that A-line, wherein the one or more 2D digital edge and/or texture features for that A-line comprise one or more of: one or more filters from a Leung-Malik Filter Bank for that slice, one or more filters from a Schmid Filter Bank for that slice, one or more Laplacian of Gaussian filters for that slice, one or more Laplacian filters for that slice, one or more Gaussian filters for that slice, one or more high pass filters for that slice, a Sobel filter for that slice, a Prewitt filter for that slice, one or more local entropies for that slice, one or more local standard deviations for that slice, or one or more local ranges for that slice.

Example 9 comprises the subject matter of any variation of any of example(s) 1-8, wherein, for each A-line of the one or more A-lines, the one or more features for that A-line comprise one or more three-dimensional (3D) digital edge and/or texture features for that A-line, wherein the one or more 3D digital edge and/or texture features for that A-line comprise one or more of: one or more Laplacian filters for the vascular imaging data, one or more Laplacian of Gaussian filters for the vascular imaging data, one or more Gaussian filters for the vascular imaging data, one or more high pass filters for the vascular imaging data, a Sobel filter for the vascular imaging data, or a Prewitt filter for the vascular imaging data.

Example 10 comprises the subject matter of any variation of any of example(s) 1-9, wherein, for each A-line of the one or more A-lines, the one or more features for that A-line comprise one or more deep learned features generated via a deep learning network.

Example 11 comprises the subject matter of any variation of any of example(s) 1-10, wherein the at least one classifier comprises a three-class (3C) classifier.

Example 12 comprises the subject matter of any variation of any of example(s) 1-11, wherein the at least one classifier comprises dual binary (DB) classifiers.

Example 13 comprises the subject matter of any variation of any of example(s) 1-12, wherein the at least one classifier comprises a random forest (RF) classifier.

Example 14 comprises the subject matter of any variation of any of example(s) 1-13, wherein the at least one classifier comprises a support vector machine (SVM) classifier.

Example 15 comprises the subject matter of any variation of any of example(s) 1-14, wherein the vascular imaging data comprises intravascular optical coherence tomography (IVOCT) imaging data.

Example 16 comprises the subject matter of any variation of any of example(s) 15, wherein the vascular imaging data further comprises near-infrared fluorescence imaging data.

Example 17 comprises the subject matter of any variation of any of example(s) 1-16, wherein the vascular imaging data comprises intravascular ultrasound (IVUS) imaging data.

Example 18 is an apparatus that facilitates classification of vascular plaques, the apparatus comprising: a memory configured to store instructions; one or more processors configured to execute the instructions to: access vascular imaging data comprising one or more slices, wherein each slice comprises a plurality of A-lines of that slice; for each A-line of the plurality of A-lines of each slice of the one or more slices: extract one or more features for that A-line, wherein the one or more features for that A-line comprise at least one of one or more features of that A-line or one or more features of the slice comprising that A-line; provide the one or more features for that A-line to at least one classifier; and generate a classification of that A-line via the at least one classifier, wherein the classification of that A-line is one of fibrocalcific, fibrolipidic, or other.

Example 19 comprises the subject matter of any variation of any of example(s) 18, wherein, for each A-line of the plurality of A-lines of that slice, the one or more features for that A-line comprise at least one of: one or more lumen morphological features for that A-line, one or more imaging features for that A-line, one or more A-line peak features for that A-line, one or more two-dimensional (2D) digital edge and/or texture features for that A-line, one or more three-dimensional (3D) digital edge and/or texture features for that A-line, or one or more deep learned features generated via a deep learning network.

Example 20 is a non-transitory computer-readable medium storing computer-executable instructions that, when executed, cause a processor to perform operations, comprising: accessing a training set of vascular imaging data comprising one or more vascular imaging volumes, wherein each vascular imaging volume comprises one or more slices, and wherein each slice comprises a plurality of A-lines of that slice, and wherein each A-line of the plurality of A-lines of that slice is associated with a ground truth classification for that A-line, wherein the ground truth classification for that A-line is one of fibrocalcific, fibrolipidic, or other; for each A-line of the plurality of A-lines of each slice of the one or more slices of each vascular imaging volume of the one or more vascular imaging volumes: extracting one or more features for that A-line, wherein the one or more features for that A-line comprise at least one of: one or more features extracted from that A-line, one or more features extracted from the slice comprising that A-line, or one or more features extracted from the vascular imaging data; training at least one classifier based on the one or more features for that A-line and the ground truth classification for that A-line.

Example 21 comprises the subject matter of any variation of any of example(s) 20, wherein the operations further comprise performing pre-processing on the training set of vascular imaging data.

Example 22 comprises the subject matter of any variation of any of example(s) 20-21, wherein the operations further comprise selecting the one or more features from a set of candidate features via one of a minimal-redundancy-maximum-relevance method or a Wilcoxon method.

Example 23 comprises the subject matter of any variation of any of example(s) 20-22, wherein the at least one classifier is one of a three-class (3C) classifier or dual binary (DB) classifiers.

Example 24 comprises the subject matter of any variation of any of example(s) 20-23, wherein the at least one classifier comprises one or more of a random forest (RF) classifier or a support vector machine (SVM) classifier.

Example 25 comprises the subject matter of any variation of any of example(s) 20-24, wherein the operations further comprise normalizing each feature of the one or more features across a range of values observed for that feature in the training set of vascular imaging data.

Example 26 comprises the subject matter of any variation of any of example(s) 20-25, wherein the operations further comprise validating the one or more classifiers based on a test set of vascular imaging data.

Example 27 comprises the subject matter of any variation of any of example(s) 20-26, wherein the training set of vascular imaging data comprises an in vivo training set of vascular imaging data and an ex vivo training set of vascular imaging data.

Example 28 comprises the subject matter of any variation of any of example(s) 20-27, wherein, for each A-line of the plurality of A-lines of each slice of the one or more slices of each vascular imaging volume of the one or more vascular imaging volumes, the one or more features for that A-line comprise at least one of: one or more lumen morphological features for that A-line, one or more imaging features for that A-line, one or more A-line peak features for that A-line, one or more two-dimensional (2D) digital edge and/or texture features for that A-line, one or more three-dimensional (3D) digital edge and/or texture features for that A-line, or one or more deep learned features generated via a deep learning network.

Example 29 comprises an apparatus comprising means for executing any of the described operations of examples 1-28.

Example 30 comprises a machine readable medium that stores instructions for execution by a processor to perform any of the described operations of examples 1-28.

Example 31 comprises an apparatus comprising: a memory; and one or more processors configured to: perform any of the described operations of examples 1-28.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions that, when executed, cause a processor to perform operations, comprising:
    accessing vascular imaging data comprising one or more slices, wherein each slice comprises a plurality of A-lines of that slice;
    for each A-line of the plurality of A-lines of each slice of the one or more slices:
        extracting one or more features for that A-line, wherein the one or more features for that A-line comprise at least one of: one or more features extracted from that A-line, one or more features extracted from the slice comprising that A-line, or one or more features extracted from the vascular imaging data;
        providing the one or more features for that A-line to at least one classifier; and
        generating a classification of that A-line via the at least one classifier, wherein the classification of that A-line is one of fibrocalcific, fibrolipidic, or other.

2. The non-transitory computer-readable medium of claim 1, wherein the operations further comprise performing pre-processing on the vascular imaging data.

3. The non-transitory computer-readable medium of claim 2, wherein performing pre-processing on the vascular imaging data comprises one or more of: performing speckle reduction on the vascular imaging data, performing imaging correction on the vascular imaging data, or segmenting a lumen in the vascular imaging data.

4. The non-transitory computer-readable medium of claim 1, wherein the operations further comprise cleaning classification results of the at least one classifier based on a fully connected conditional random field (CRF).

5. The non-transitory computer-readable medium of claim 1, wherein, for each A-line of the plurality of A-lines of that slice, the one or more features for that A-line comprise one or more lumen morphological features for that A-line, wherein the one or more lumen morphological features for that A-line comprise one or more of: a change in lumen area of that slice compared to one or more adjacent slices, a Frame Lumen Eccentricity (FLE) of that slice, a change in FLE across z of that slice compared to the one or more adjacent slices, an A-line Lumen Eccentricity (ALE) of that A-line, a mean of the ALE in an A-line neighborhood surrounding that A-line, a standard deviation of the ALE in the A-line neighborhood surrounding that A-line, a change in the ALE of that A-line compared to the one or more adjacent slices, a change in a mean of the ALE of that A-line compared to the one or more adjacent slices, a change in a standard deviation of the ALE of that A-line compared to the one or more adjacent slices, an anatomical view local curvature of that A-line, or an R-θ lumen curvature of that A-line.

6. The non-transitory computer-readable medium of claim 1, wherein, for each A-line of the one or more A-lines, the one or more features for that A-line comprise one or more imaging features for that A-line, wherein the one or more imaging features for that A-line comprise one or more of: an image intensity of that A-line, an imaging attenuation of that A-line, a distance between a catheter and a lumen boundary of that A-line, or a distance to a background intensity of that A-line.

7. The non-transitory computer-readable medium of claim 1, wherein, for each A-line of the one or more A-lines, the one or more features for that A-line comprise one or more A-line peak features for that A-line, wherein the one or more A-line peak features for that A-line comprise one or more of: a number of prominent peaks of that A-line; Euclidean distances between a first n peaks of that A-line, wherein n is a positive integer; widths of the first n peaks of that A-line; prominences of the first n peaks of that A-line; locations of the first n peaks of that A-line; a polynomial curve fitting of that A-line; a location where a signal falls below a threshold intensity for that A-line; or an area under a curve of that A-line.

8. The non-transitory computer-readable medium of claim 1, wherein, for each A-line of the one or more A-lines, the one or more features for that A-line comprise one or more two-dimensional (2D) digital edge and/or texture features for that A-line, wherein the one or more 2D digital edge and/or texture features for that A-line comprise one or more of: one or more filters from a Leung-Malik Filter Bank for that slice, one or more filters from a Schmid Filter Bank for that slice, one or more Laplacian of Gaussian filters for that slice, one or more Laplacian filters for that slice, one or more Gaussian filters for that slice, one or more high pass filters for that slice, a Sobel filter for that slice, a Prewitt filter for that slice, one or more local entropies for that slice, one or more local standard deviations for that slice, or one or more local ranges for that slice.

9. The non-transitory computer-readable medium of claim 1, wherein, for each A-line of the one or more A-lines, the one or more features for that A-line comprise one or more three-dimensional (3D) digital edge and/or texture features for that A-line, wherein the one or more 3D digital edge and/or texture features for that A-line comprise one or more of: one or more Laplacian filters for the vascular imaging data, one or more Laplacian of Gaussian filters for the vascular imaging data, one or more Gaussian filters for the vascular imaging data, one or more high pass filters for the vascular imaging data, a Sobel filter for the vascular imaging data, or a Prewitt filter for the vascular imaging data.

10. The non-transitory computer-readable medium of claim 1, wherein, for each A-line of the one or more A-lines, the one or more features for that A-line comprise one or more deep learned features generated via a deep learning network.

11. The non-transitory computer-readable medium of claim 1, wherein the at least one classifier comprises a three-class (3C) classifier.

12. The non-transitory computer-readable medium of claim 1, wherein the at least one classifier comprises dual binary (DB) classifiers.

13. The non-transitory computer-readable medium of claim 1, wherein the at least one classifier comprises a random forest (RF) classifier.

14. The non-transitory computer-readable medium of claim 1, wherein the at least one classifier comprises a support vector machine (SVM) classifier.

15. The non-transitory computer-readable medium of claim 1, wherein the vascular imaging data comprises intravascular optical coherence tomography (IVOCT) imaging data.

16. The non-transitory computer-readable medium of claim 15, wherein the vascular imaging data further comprises near-infrared fluorescence imaging data.

17. The non-transitory computer-readable medium of claim 1, wherein the vascular imaging data comprises intravascular ultrasound (IVUS) imaging data.

18. An apparatus that facilitates classification of vascular plaques, the apparatus comprising:
  a memory configured to store instructions;
  one or more processors configured to execute the instructions to:
    access vascular imaging data comprising one or more slices, wherein each slice comprises a plurality of A-lines of that slice;
    for each A-line of the plurality of A-lines of each slice of the one or more slices:
      extract one or more features for that A-line, wherein the one or more features for that A-line comprise at least one of one or more features of that A-line or one or more features of the slice comprising that A-line;
      provide the one or more features for that A-line to at least one classifier; and
      generate a classification of that A-line via the at least one classifier, wherein the classification of that A-line is one of fibrocalcific, fibrolipidic, or other.

19. The apparatus of claim 18, wherein, for each A-line of the plurality of A-lines of that slice, the one or more features for that A-line comprise at least one of: one or more lumen morphological features for that A-line, one or more imaging features for that A-line, one or more A-line peak features for that A-line, one or more two-dimensional (2D) digital edge and/or texture features for that A-line, one or more three-dimensional (3D) digital edge and/or texture features for that A-line, or one or more deep learned features generated via a deep learning network.

20. A non-transitory computer-readable medium storing computer-executable instructions that, when executed, cause a processor to perform operations, comprising:
  accessing a training set of vascular imaging data comprising one or more vascular imaging volumes, wherein each vascular imaging volume comprises one or more slices, and wherein each slice comprises a plurality of A-lines of that slice, and wherein each A-line of the plurality of A-lines of that slice is associated with a ground truth classification for that A-line, wherein the ground truth classification for that A-line is one of fibrocalcific, fibrolipidic, or other;
  for each A-line of the plurality of A-lines of each slice of the one or more slices of each vascular imaging volume of the one or more vascular imaging volumes:
    extracting one or more features for that A-line, wherein the one or more features for that A-line comprise at least one of: one or more features extracted from that A-line, one or more features extracted from a slice comprising that A-line, or one or more features extracted from the training set of the vascular imaging data; and
    training at least one classifier based on the one or more features for that A-line and the ground truth classification for that A-line.

21. The non-transitory computer-readable medium of claim 20, wherein the operations further comprise performing pre-processing on the training set of vascular imaging data.

22. The non-transitory computer-readable medium of claim 20, wherein the operations further comprise selecting the one or more features from a set of candidate features via one of a minimal-redundancy-maximum-relevance method or a Wilcoxon method.

23. The non-transitory computer-readable medium of claim 20, wherein the at least one classifier is one of a three-class (3C) classifier or dual binary (DB) classifiers.

24. The non-transitory computer-readable medium of claim 20, wherein the at least one classifier comprises one or more of a random forest (RF) classifier or a support vector machine (SVM) classifier.

25. The non-transitory computer-readable medium of claim 20, wherein the operations further comprise normalizing each feature of the one or more features across a range of values observed for that feature in the training set of vascular imaging data.

26. The non-transitory computer-readable medium of claim 20, wherein the operations further comprise validating the at least one classifier based on a test set of vascular imaging data.

27. The non-transitory computer-readable medium of claim 20, wherein the training set of vascular imaging data comprises an in vivo training set of vascular imaging data and an ex vivo training set of vascular imaging data.

28. The non-transitory computer-readable medium of claim 20, wherein, for each A-line of the plurality of A-lines of each slice of the one or more slices of each vascular imaging volume of the one or more vascular imaging volumes, the one or more features for that A-line comprise at least one of: one or more lumen morphological features for that A-line, one or more imaging features for that A-line, one or more A-line peak features for that A-line, one or more two-dimensional (2D) digital edge and/or texture features for that A-line, one or more three-dimensional (3D) digital edge and/or texture features for that A-line, or one or more deep learned features generated via a deep learning network.

\* \* \* \* \*